US010499088B1

(12) United States Patent
Woschank et al.

(10) Patent No.: US 10,499,088 B1
(45) Date of Patent: Dec. 3, 2019

(54) LIVE VIDEO STREAMING SYSTEM AND METHOD

(71) Applicant: Halogen Networks, LLC, Winter Park, FL (US)

(72) Inventors: Markus Woschank, Vienna (AT); Christian Maan, Vienna (AT); Patrick Marschik, Vienna (AT); Marc Dietrichstein, Vienna (AT); Eric Richardson, Durham, NC (US); Kevin Conner, Durham, NC (US); Thomas Steven Miller, Winter Park, FL (US); Joseph August Fisher, III, Maitland, FL (US); William Bronson Tubb, Jr., Oviedo, FL (US)

(73) Assignee: Halogen Networks, LLC, Winter Park, FL (US)

( * ) Notice: Subject to any disclaimer, the term of this patent is extended or adjusted under 35 U.S.C. 154(b) by 153 days.

(21) Appl. No.: 15/298,012

(22) Filed: Oct. 19, 2016

Related U.S. Application Data

(60) Provisional application No. 62/332,312, filed on May 5, 2016, provisional application No. 62/244,027, filed on Oct. 20, 2015.

(51) Int. Cl.
*H04N 21/2187* (2011.01)
*H04N 21/24* (2011.01)
(Continued)

(52) U.S. Cl.
CPC ..... *H04N 21/2187* (2013.01); *H04N 21/2393* (2013.01); *H04N 21/2396* (2013.01); *H04N 21/234309* (2013.01); *H04N 21/2402* (2013.01); *H04N 21/25435* (2013.01); *H04N 21/26258* (2013.01); *H04N 21/435* (2013.01); *H04N 21/437* (2013.01); *H04N 21/632* (2013.01); *H04N 21/6473* (2013.01); *H04N 21/83* (2013.01)

(58) Field of Classification Search
CPC ......... H04N 21/2187; H04N 21/23409; H04N 21/2393; H04N 21/2396; H04N 21/25435; H04N 21/26258; H04N 21/437; H04N 21/632
See application file for complete search history.

(56) References Cited

U.S. PATENT DOCUMENTS 5,974,398 A 10/1999 Hanson et al.
7,038,474 B2 5/2006 Mcginnis et al.
(Continued)

*Primary Examiner* — Jeremy S Duffield
(74) *Attorney, Agent, or Firm* — Knobbe, Martens, Olson & Bear, LLP

(57) ABSTRACT

Systems and methods for broadcasting a video stream are disclosed. The systems and methods can receive a video stream from a broadcaster, process the video steam, store the video streaming, and deliver the video stream to a viewer as a live video stream or a video on demand. The viewer may use an access token to access the video stream. The systems and methods may include an error detection mechanism for detecting an interrupt in the video stream. The systems and methods can restore the access token to its original state if an error is detected. The systems and methods can also include one or more link sharing mechanisms for sharing links to a video stream. The shareable links may be associated with share tokens.

20 Claims, 25 Drawing Sheets

(51) Int. Cl.
*H04N 21/647* (2011.01)
*H04N 21/83* (2011.01)
*H04N 21/262* (2011.01)
*H04N 21/435* (2011.01)
*H04N 21/437* (2011.01)
*H04N 21/239* (2011.01)
*H04N 21/2543* (2011.01)
*H04N 21/2343* (2011.01)
*H04N 21/63* (2011.01)

(56) References Cited

U.S. PATENT DOCUMENTS

| | | | |
|---|---|---|---|
| 7,076,463 B1 | 7/2006 | Boies et al. | |
| 7,657,651 B2 | 2/2010 | Amini et al. | |
| 7,689,905 B1 | 3/2010 | Farn et al. | |
| 7,711,900 B2 | 5/2010 | Booth et al. | |
| 7,716,263 B2 | 5/2010 | Masek | |
| 7,739,340 B2 | 6/2010 | Arenburg et al. | |
| 7,746,998 B2 | 6/2010 | Flores et al. | |
| 7,752,315 B2 | 7/2010 | Da Palma et al. | |
| 7,756,157 B2 | 7/2010 | Bellwood et al. | |
| 7,756,973 B2 | 7/2010 | Alt et al. | |
| 7,770,161 B2 | 8/2010 | Mitran et al. | |
| 7,801,824 B1* | 9/2010 | Bryar | G06Q 20/367 725/136 |
| 9,117,227 B1 | 8/2015 | Agrawal et al. | |
| 9,356,806 B2 | 5/2016 | Chowdhury et al. | |
| 9,361,322 B1 | 6/2016 | Dutta et al. | |
| 9,462,340 B1 | 10/2016 | Mathurin | |
| 9,621,932 B2 | 4/2017 | Pettis et al. | |
| 2004/0123323 A1* | 6/2004 | Russo | H04N 21/25435 725/88 |
| 2004/0181807 A1* | 9/2004 | Theiste | H04N 21/26241 725/82 |
| 2006/0041444 A1 | 2/2006 | Flores et al. | |
| 2006/0066325 A1 | 3/2006 | Mcginnis et al. | |
| 2007/0130345 A1 | 5/2007 | Da Palma et al. | |
| 2007/0130359 A1 | 6/2007 | Amini et al. | |
| 2007/0150880 A1 | 6/2007 | Mitran et al. | |
| 2007/0255830 A1 | 11/2007 | Alt et al. | |
| 2008/0071868 A1 | 3/2008 | Arenburg et al. | |
| 2008/0222352 A1 | 9/2008 | Booth et al. | |
| 2008/0310445 A1 | 12/2008 | Bellwood et al. | |
| 2012/0089681 A1 | 4/2012 | Chowdhury et al. | |
| 2013/0286211 A1 | 10/2013 | Cao | |
| 2013/0347046 A1* | 12/2013 | Bluvband | G06F 3/005 725/109 |
| 2014/0122601 A1 | 5/2014 | Poston et al. | |
| 2014/0143439 A1* | 5/2014 | Ramamurthy | H04N 21/23439 709/231 |
| 2014/0289785 A1 | 9/2014 | Alexander | |
| 2015/0089514 A1 | 3/2015 | Grewal et al. | |
| 2015/0149281 A1 | 5/2015 | Carrotte et al. | |
| 2015/0189018 A1* | 7/2015 | Cassidy | H04N 21/23106 709/219 |
| 2015/0215661 A1 | 7/2015 | Wang et al. | |
| 2015/0227624 A1 | 8/2015 | Busch et al. | |
| 2015/0312236 A1 | 10/2015 | Ducker et al. | |
| 2015/0362917 A1 | 12/2015 | Wang et al. | |
| 2015/0378584 A1 | 12/2015 | Folgner et al. | |
| 2016/0007052 A1 | 1/2016 | Haitsuka et al. | |
| 2016/0028673 A1 | 1/2016 | Jeyaraman et al. | |
| 2016/0029102 A1 | 1/2016 | Daily et al. | |
| 2016/0048864 A1* | 2/2016 | Beer | G06Q 30/0226 705/14.27 |
| 2016/0057457 A1 | 2/2016 | Clements et al. | |
| 2016/0066002 A1* | 3/2016 | Dachiraju | H04N 21/2404 725/2 |
| 2016/0080525 A1 | 3/2016 | Ward | |
| 2016/0080820 A1 | 3/2016 | Lee et al. | |
| 2017/0093769 A1* | 3/2017 | Lind | H04N 21/4307 |

* cited by examiner

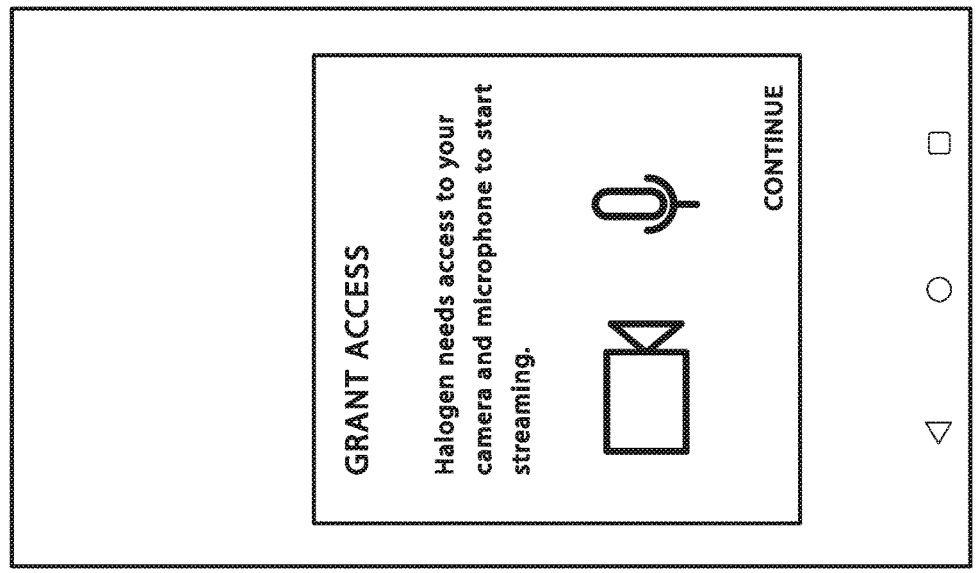
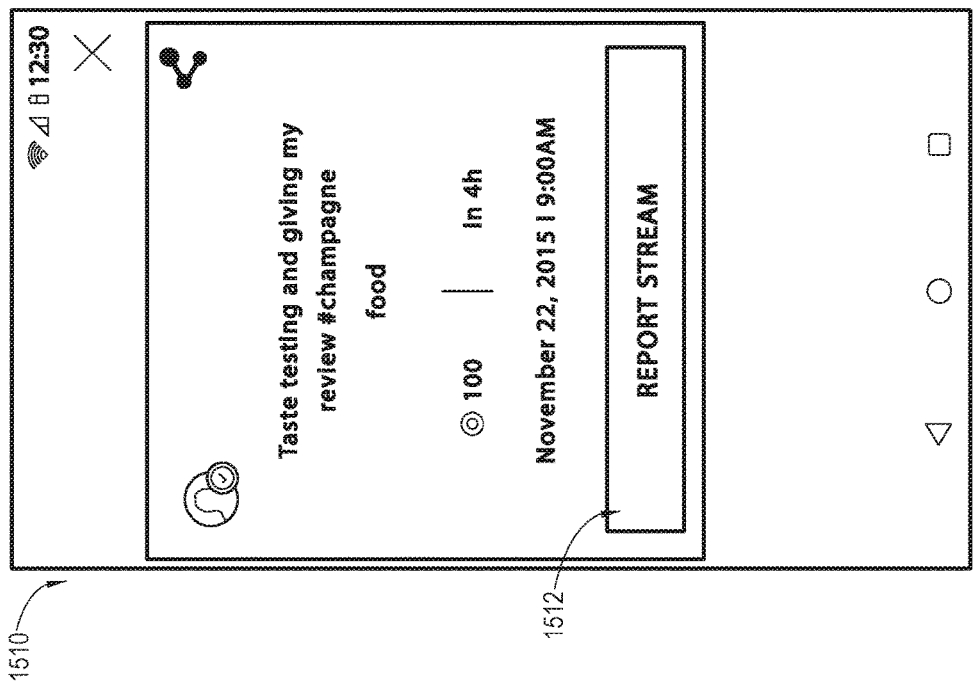
FIG. 15

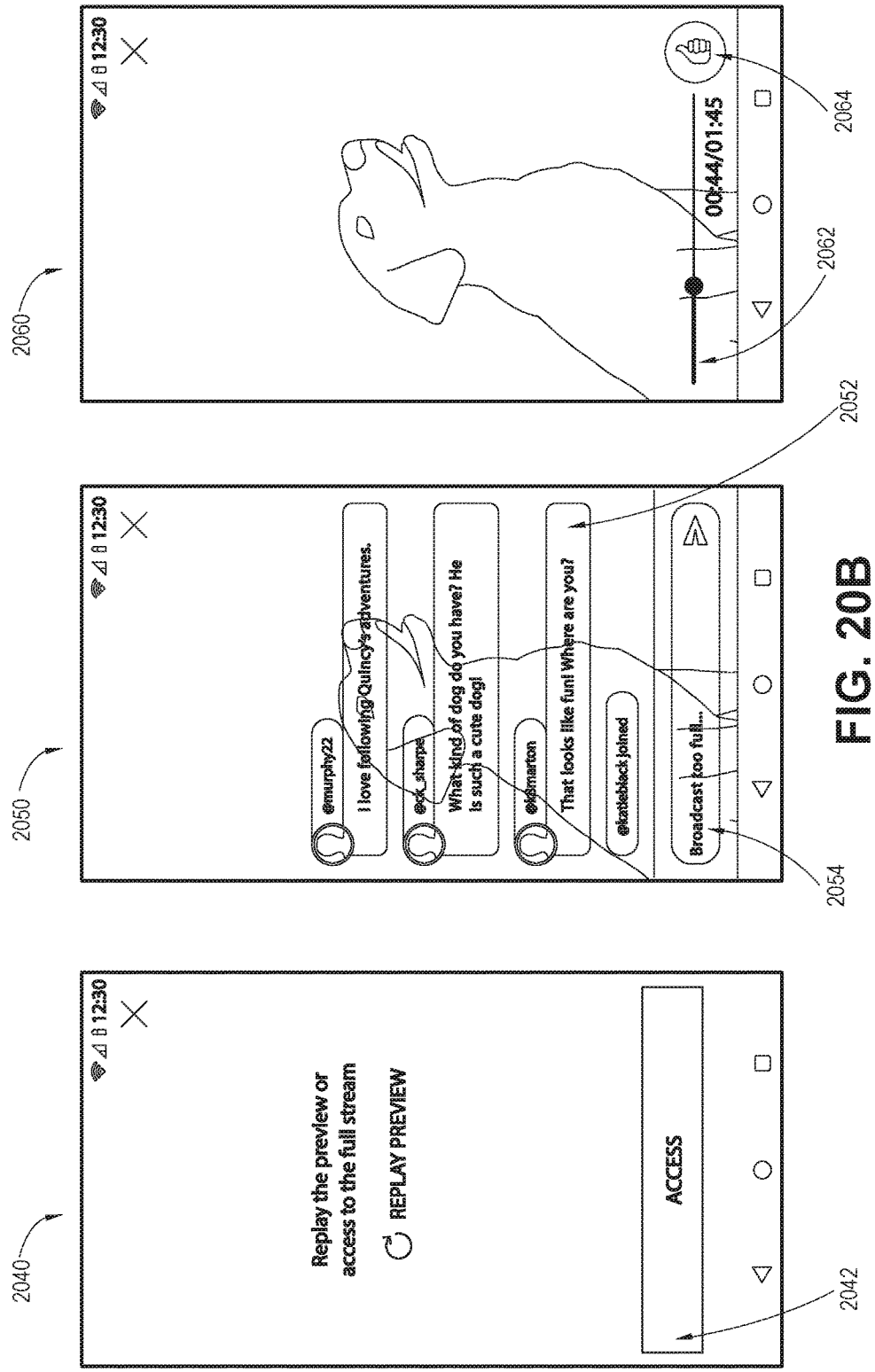

LIVE VIDEO STREAMING SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

SUMMARY

In one embodiment, a system for detecting an interrupted video stream broadcast is disclosed. The system can comprise a video streaming system comprising a plurality of servers configured in a distributed network architecture and at least one of the plurality of servers comprising a hardware processor. The hardware processor can be configured to: receive first video data from a first client device, the first video data comprising a plurality of bits of video; store the first video data in a video data store comprising physical computer storage, for subsequent processing; encode the first video data into second video data appropriate for subsequent broadcasting as a video stream to a plurality of other client devices subscribed to access the video stream, wherein encoding of the first video data into second video data formats the second video data into a plurality of video formats compatible with a plurality of different video processing protocols used by the other client devices; broadcast bits of the video stream to at least some of the other client devices while receiving additional bits of the first video data from the first client device, the additional bits also adapted to be subsequently stored, encoded, and broadcasted as part of the video stream; receive a request for access to the video stream from a second client device of the plurality of other client devices; communicate with a token processing system to identify an access token stored in a token repository and associated with the second client device; determine whether the access token associated with the second client device meets a threshold condition for accessing the video stream; in response to a determination that the access token associated with the second client device meets the threshold condition, stream the second video data to the second client device and process the access token; determine whether the second video data has streamed for a threshold time duration; and in response to a determination that the second video data has streamed less than the threshold time duration, return the access token to its original state prior to the request for access to the video stream by the second client device.

In another embodiment, a method for detecting an interrupted video stream broadcast is disclosed. The method may be performed under control of a video streaming system comprising a plurality of servers configured in a distributed network architecture, at least one of the plurality of servers comprising a hardware processor. The method can comprise: receiving first video data from a first client device, the first video data comprising a plurality of bits of video; splitting the first video data into a plurality of video segments; storing the plurality of video segments in a data store for subsequent processing; generating a playlist comprising links to video segments in the plurality of video segments; encoding the first video data into second video data appropriate for subsequent broadcasting as a video stream to a plurality of other client devices subscribed to access the video stream; receiving a request for access to the video stream from a second client device of the plurality of other client devices; determining whether a threshold condition is met for accessing the video stream by analyzing an access token in a token repository associated with the second client device; in response to a determination that the threshold condition is not met, communicating at least a portion of the playlist to the second client device and broadcasting the video segments on the playlist to the second client device; determining whether the second client device has received at least a predetermined duration of the video stream; and in response to a determination that the second client device has received at least the predetermined duration of the video stream, processing the access token.

In yet another embodiment, a system for detecting an interrupted video stream broadcast is disclosed. The system can comprise a video processing system comprising a plurality of servers, the video processing system configured to: receive first video data streamed from a first client device, create a playlist comprising links to video segments of a video stream generated based at least partly on the first video data, and store the playlist and the video segments of the video stream in a data store comprising physical computer storage. The system can also comprise a video streaming system comprising a hardware processor, the video streaming system configured to: receive a request from a second client device for accessing the video stream; communicate with a token repository of the second client device to determine whether the token repository comprises one or more access tokens associated with the second client device; in response to a determination that the token repository of the second client device comprises the one or more access tokens, process the one or more access tokens and communicate the playlist to the second client device for accessing the video stream by the second client device; determine whether the second client device fails to stream the video stream for a predetermined duration of time; and in response to a determination that the second client device fails to stream the video stream for the predetermined duration of time, restore the one or more access tokens to their original state prior to being processed by the video streaming system.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

FIGS. 14A, 14B, and 15 depict example user interfaces for creating and configuring a video stream.

FIGS. 20A and 20B depict example user interfaces for viewing a video stream.

DETAILED DESCRIPTION

I. Overview

Figure 1:
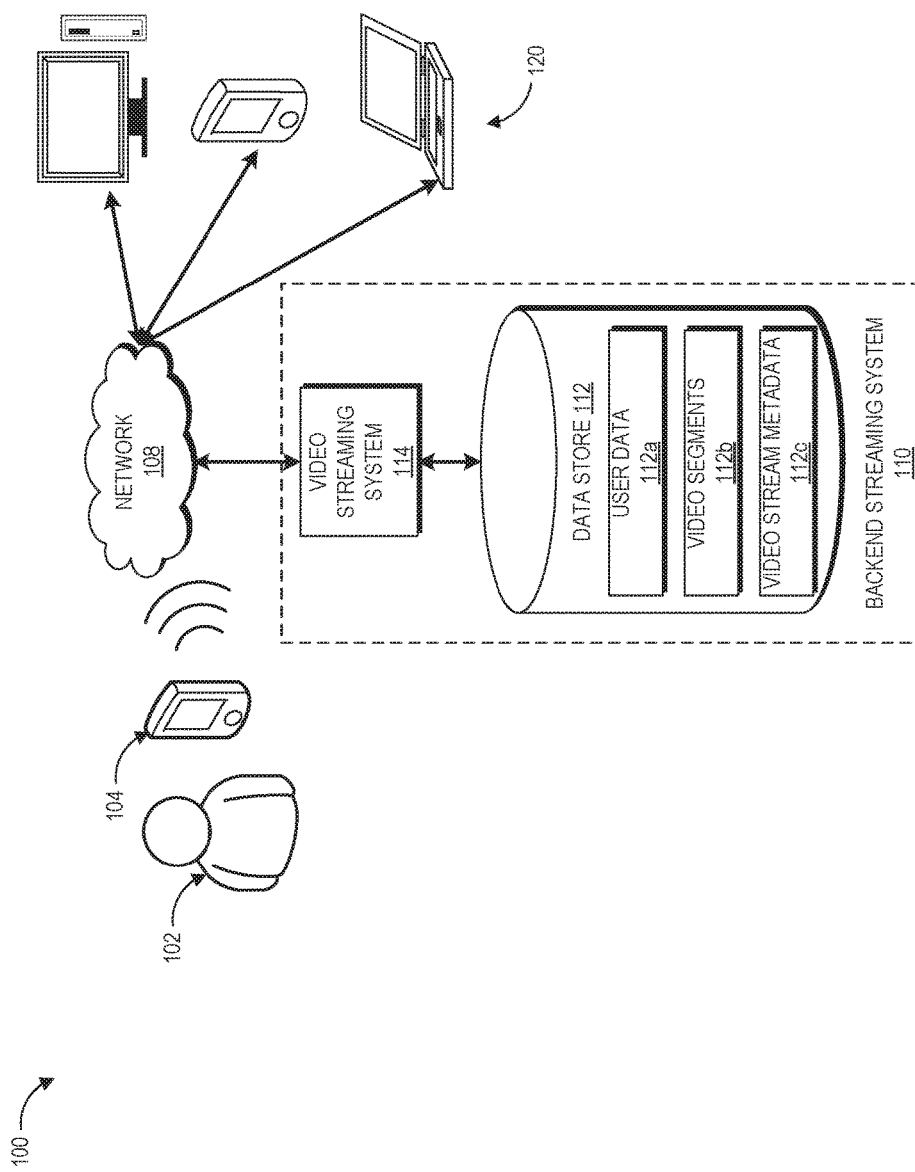
FIG. 1 depicts an example computing environment for a live video streaming system.

This disclosure describes embodiments of a mobile application and associated system that enable live streaming and access to live streaming events. In certain embodiments, the mobile application and associated system enable users to create live video streams for friends and followers, view streams from friends and followers, and/or subscribe to favorite streamers to receive exclusive access to their streams. The viewer may access a video stream by providing an access token (or multiple tokens). The video streaming system described herein can process the access token(s) to determine whether the access token meets one or more criteria, and if so, provide the viewer with access to the video stream.

Advantageously, in certain embodiments, the video streaming system can also include an interruption detection mechanism in which the video streaming system can restore the access token(s) to its original condition if the video streaming system detects that the video stream fails play for a threshold duration of time.

In another embodiment, the video streaming system can also allow a user to share a link to the video stream with other users. The video streaming system can allow a broadcaster to configure a share token associated with the shareable link. If a viewer accesses the video through the shareable link, the video streaming system can update the token repositories associated with the broadcaster and the viewer who shares the link, based on the share token.

The video stream may be a live video stream in which the broadcaster records a video and broadcasts it to viewers in real-time or near real time. The video stream may also be a video on demand (VOD), which allows viewers to select and watch the video content when they choose to, rather than watching in real-time as the video broadcaster streams the video. For convenience, this disclosure refers to the terms "video" and its derivatives, in addition to having their ordinary meaning, to mean both live video and VOD, except where otherwise noted.

Further, the term "live video," in addition to having its ordinary meaning, can refer to video that is broadcast to one or more users over a network shortly after the video is captured. For example, a portion of a video may be captured at a broadcaster user's device, sent to a backend system, which in turn broadcasts the portion of the video (or a processed version thereof) to one or more users. While the backend system is broadcasting the portion of the video, the broadcaster may be continuing to capture and send additional portions of video to the backend system, which in turn continues to broadcast the additional portions of the video (or processed versions thereof) to the one or more users. The live video may be received and viewed by a viewer at a short time delay from when it is transmitted by a broadcaster, but the viewer may perceive the video as if the video is being captured and transmitted instantaneously or near instantaneously.

II. Example Video Streaming Computing Environment

FIG. 1 depicts an example computing environment for a live video streaming system. In the computing environment 100, a streaming user 102 can capture a video using a computing device 104. For example, the computing device 120 may include a camera that can capture live video of the streaming user 102 (sometimes referred to herein as a broadcaster 102) or whatever the user 102 is interested in capturing. The computing device 104 may be any device with a processor, such as (but not limited to) a smart phone, cell phone, tablet, phablet, laptop, television, or desktop computer. An application (not shown) installed on the computing device 120 can capture video obtained from the camera of the computing device 120 and transmit the video in real-time or near real-time to a network 108. The network 108 can be a local area network (LAN), a wide area network (WAN), the public Internet, a private intranet, or combinations of the same or the like.

The video is transmitted over the network 108 to user devices 120. Each user device 120 may be any device with a processor, such as but not limited to a smart phone, cell phone, tablet, phablet, laptop, television, or desktop computer. Each user device 120 can have installed them on a video streaming app (e.g. video apps 222, 322). The video steaming app installed on the user devices 120 can be a copy of the same app or a different app that is installed on the broadcaster's 102 user device 104. Using the video streaming app, the viewers can access the live video stream output by the broadcaster's 102 computing device 104. Example interfaces and functionalities of the video streaming app are described with reference to FIGS. 10-21.

The backend streaming system 110 can also be in communication with the network 108. This backend streaming system 110 can include a video streaming system 114 which can manage various features associated with the video streaming app installed on the user devices 120 as well as the corresponding app installed on the broadcaster's 102 device 104. The backend streaming system 110 can include one or more physical and/or virtual servers, which may be physically co-located or geographically dispersed, for example, in one or more data centers. The backend streaming system 110 may be implemented in a cloud computing platform or in a content delivery network (CDN). The backend streaming system 110 can communicate with physical computer data storage 112 in the depicted embodiment. This data storage 112 can store user data 112a and videos captured by the users (such as video segments 112b and video stream metadata 112c). More detailed examples of the backend streaming system 110 are described with reference to FIGS. 2A and 2B.

III. Example Backend Streaming Systems

Figure 2A:
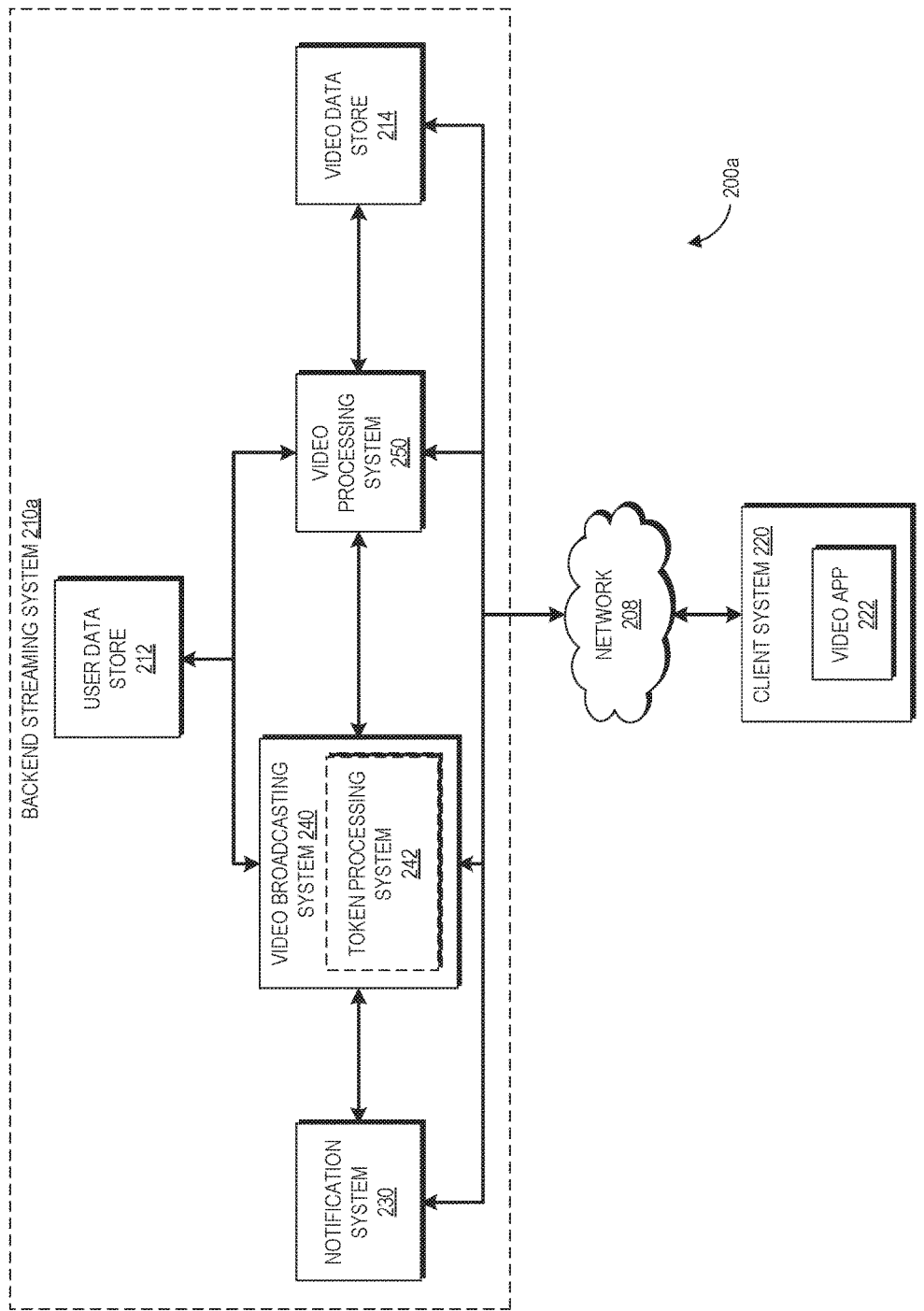
FIGS. 2A and 2B depict examples of a backend streaming system.
Figure 2B:
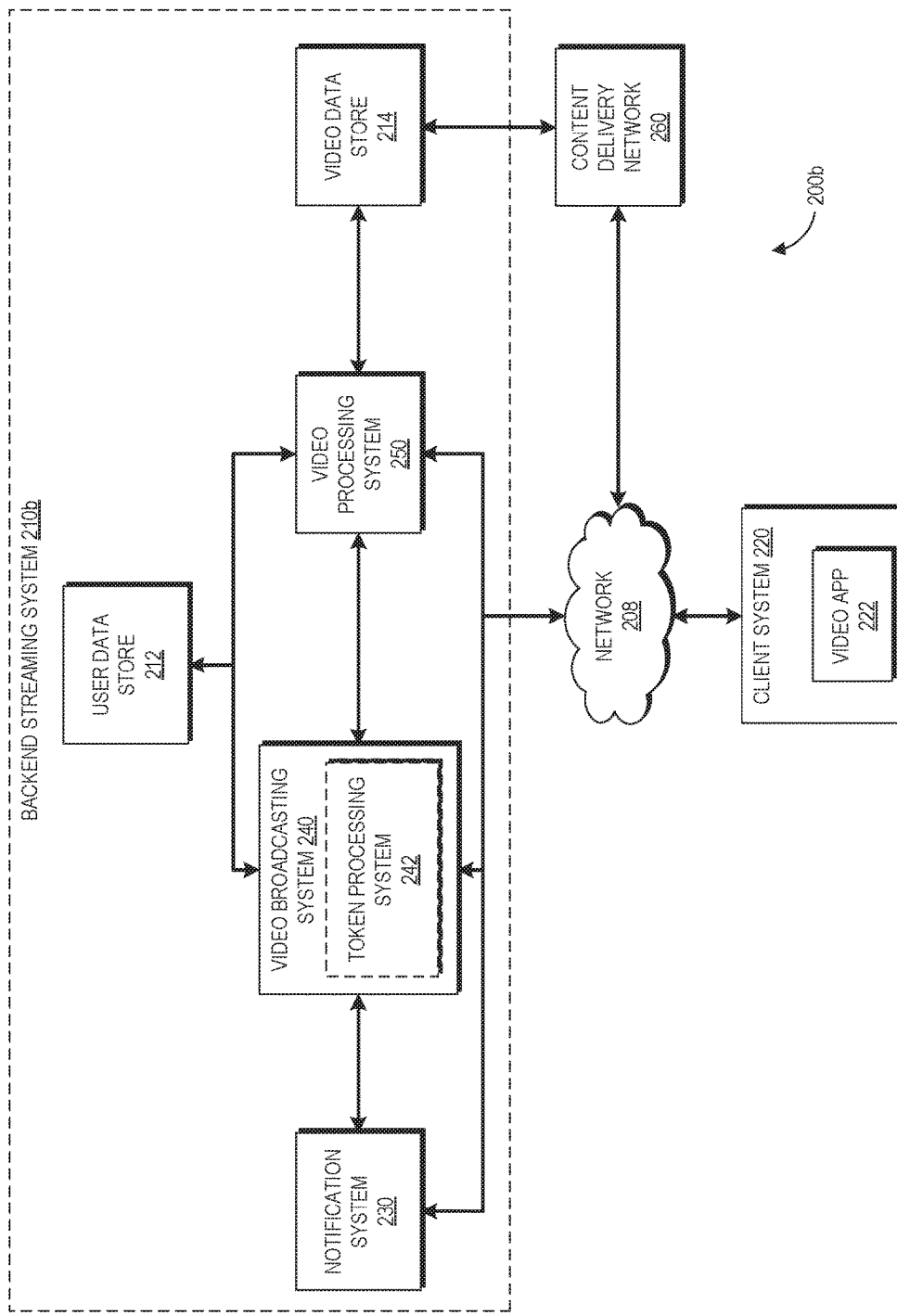

FIGS. 2A and 2B depict examples of a backend streaming system. The backend streaming systems 210a and 210b are embodiments of the backend streaming system 110 shown in FIG. 1. In the computing environments 200a and 200b, the backend streaming systems 210a and 210b are in communication with the client system 220 via the network 208. The network 208 is an embodiment of the network 108 shown in FIG. 1. The client system 220 can include a video streaming app 222 which can allow a user to create and/or view video streams. The client system 220 is an embodiment of the computing devices 120 or the computing device 104 shown in FIG. 1. For convenience, FIGS. 2A and 2B illustrate one client computing system 220, although multiple client systems may communicate with the backend systems 210a, 210b. For example, multiple broadcasters and viewers can be in communication with the backend streaming system 210a, 210b during a video streaming session.

With reference to FIG. 2A, the backend streaming system 210a may include a user data store 212, a notification system 230, a video processing system 250, and a video data store 214. The user data store 212 and/or the video data store 214 are embodiments of the data store 112 shown in FIG. 1. With respect to FIG. 2B the computing environment 200b can include a content delivery network (CDN) 260 for delivering video data to the client system 220. The backend streaming system 210b may also include a user data store 212, a notification system 230, a video processing system 250, and a video data store 214.

By way of overview, in FIGS. 2A and 2B, the video broadcasting system 240 can receive a request from the user to access the video stream, process tokens associated with the video stream, and deliver the playlist (or video segments) to the user. For example, the video broadcasting system can deliver the playlist of a VOD on the client system and the client system can communicate with the video data store (or via the CDN 260) to download the video segments. The video processing system 260 can process a video stream received from a broadcaster, such as by breaking the video stream into multiple segments, generating or updating a playlist of the video segments, and initiating storage of the video segments. For example, the video processing system 260 can execute instructions which cause the video segments to be stored in the video data store 214 and cause the play list to be stored in the user data store 212. The notification system 230 can process user's messages (such as user's comments) and deliver notifications (such as user comments, login status, etc.) to various client systems. The user data store 212 can store user account information and video metadata such as video playlist and information related to access tokens and share tokens, and so on. The video data store 214 can store video segments, video preview image, and broadcaster's profile image, etc.

The backend streaming systems 210a and 210b are not required to include all systems described shown in FIGS. 2A and 2B. For example, in some implementations, the notification system 230 may not be part of the backend streaming system 210a/210b. The backend streaming systems 210a and 210b can also include additional systems not shown in FIGS. 2A and 2B.

a. Video Broadcasting System

The video broadcasting system 240 can deliver video stream files (such as video stream playlist and video segments in some embodiments) to the client system 220. The video broadcasting system 240 can also access user account and determine whether a user has met a threshold condition to access the video stream (such as by processing the access token(s) of the user). The functions of the video broadcasting system 240 may be performed using various Application Programming Interface (API) routines. In some implementations, portions of the video broadcasting system 240 may be implemented in a cloud computing platform using physical and/or virtual servers. For example, the cloud platforms may implement the Google App Engine™ (GAE) which can be hosted in Google™ cloud data centers. Alternatively, or in addition, the systems shown can be implemented in other cloud computing platforms such as Amazon Webs Services™, Microsoft Azure™, and so on, alone or in combination.

The video broadcasting system 240 can be in communication with various components of the backend streaming system 210. For example, the video broadcasting system 240 can communicate with the user data store 212 to retrieve and store information about the user (such as identifying information of the user), information related to tokens (such as initiation tokens and exchange tokens) and token repositories, as well as metadata of the video stream (such as a playlist of video segments, identifier of the video broadcaster, and information on access token(s) and share token(s)), and so on, in combination or the like. As another example, the video broadcasting system 240 can communicate with the video data store 214 to store and/or retrieve user profile pictures, stream preview pictures, a profane word list (to filter usernames containing profane words), etc., in combination or the like.

The video broadcasting system 240 can communicate with the video processing system 250. The video broadcasting system 240 can include multiple computing devices, such as servers or virtual computing instances on a cloud server. In some implementations, these computing devices may also be referred to as nodes. The video broadcasting system 240 can check node availabilities in the video processing system 250. For example, the video broadcasting system 240 can check whether one or more nodes of the video processing system 250 has lost network connection, or check the workload of the nodes. Additionally, the video broadcasting system 240 can select a node for stream broadcasting to a group of users or for delivering a video stream.

The video broadcasting system 240 can communicate with the client system 220 (such as, the video app 222), for example, via API routines. The video broadcasting system 240 can receive user input from the client system 220 and process user interactions such as signing up, signing in, signing out, commenting on the video streams, receiving user requests of video streams, scheduling live broadcasting, delivering video streams, filtering video streams or contents of the video streams, and so on.

In some embodiments, the video broadcasting system 240 can include a token processing system 242. The token processing system 242 can process tokens and update token repositories. The tokens may include one or more access tokens which may be processed or otherwise evaluated in order to view the video stream. For example, the broadcaster may specify an amount of access tokens that permit a user to view the video stream. The token processing system 242 can determine whether the token repository entry of the viewer has sufficient access tokens before streaming the video to the viewer. The access tokens may further include one or more types of tokens, such as an exchange token or a initiation token, or a combination. Either or both types of tokens may be used to satisfy the amount of access tokens specified by the broadcaster. A broadcaster can further define a share token used in a video sharing process. The value of the share token may be a portion of the value of the access token.

The initiation token and the exchange token of a user may be stored in an entry of a token repository, a user profile in a token repository, or some other data structure representing a particular user's data in the token repository. The token repository may be part of the user data store 212 or its own data store. Additionally or alternatively, the token repository may be part of other data stores such as the client data store 326 or user data store 112.

Although the examples show that the token processing system 242 is part of the video broadcasting system 240, at least a portion (or all) of the token processing system 242 may be part of another system. For example, the token processing system 242 may be part of a video processing system 250 or the content delivery network 260. The token processing system 242 may also be a standalone system which may be part of the backend streaming system 210, or the client system 220, alone or in combination. In some implementations, at least a portion of the token processing system may be outside of either the backend streaming systems (210a and 210b), the client system 220, or both.

b. Video Processing System

The video processing system can include a cluster of nodes. The nodes may be computer servers or instances of virtual machines, alone or in combination. For example, the video processing system may be implemented on a cloud platform as described above. The video processing system 250 may include media streaming software which may also be executed on a cloud platform. For example, the video processing system 250 may install the Wowza Streaming Engine™, available from Wowza Media Systems™, on a cluster of virtual machine instances and manage the cluster of virtual machine instances. The number of virtual machines can be automatically scaled (up or down) using information tracked by the cloud platform, such as CPU utilization of the virtual machines. In some embodiments, the number of virtual machine instances can also be automatically scaled based on other factors such as network traffic, the number of client systems in communication with the video processing system 250, expected popularity of the video stream, time of the video, length of the video, and so on, in combination or the like.

The video processing system 250 can receive and process video streams sent by the client system 220. As an example, the video processing system 250 can receive a video stream from the video app 222, select a node for broadcasting the video stream, and send the video stream to the selected node. In some implementations, the video processing system 250 can split a video stream up into multiple segments and deliver the video segments to viewer's computing devices 120 (shown in FIG. 1). The video processing system 250 can store the video segments in the video data store 214 and store the playlist associated with the video segments in the user data store 212.

The video processing system 250 can receive bits of a video stream in one format and encode/transcode the bits into another format. For example, the bits of the video stream received from the broadcaster may be in RTMP format and the video processing system 250 can encode/transcode the received video bits into HLS format before communicating to the viewer's system. In some implementations, at least a portion of such format conversion may be performed by other systems (such as the video broadcasting system 240) of the backend streaming system 210a.

In some embodiments, the video processing system 250 can use a custom plugin in a virtual machine instance. The custom plugin can allow the backend streaming system to generate video segments and update playlists efficiently without using external services that would otherwise be required to collect and post-process the output of the virtual machine instances. As a result, the backend streaming system 210a/210b can reduce latency for live streams, use fewer resources, and increase the stability of the video stream processing.

In some implementations, two different lists can be retained based on the type of video stream. For example, the live video stream may have a list of video segments where each segment is relatively small in size while the VOD may be associated with list of video segments where each segment is relatively large in size. In some embodiments, when the video processing system 250 has finished delivering a live video streaming, the video processing system 240 may execute instructions to delete the playlist of video segments for the live video stream from the user data store 212. On the other hand, the video processing system may instruct the user data store 212 to retain the list of video segments for the VOD.

The video processing system 250 can also communicate with the user data store 212 to store and update video stream metadata. For example, the video processing system 250 may update which video segments exist in a video playlist and the order of the video segments being played. The video processing system 250 can also communicate with the data store regarding video stream information such as node availability (for example, how many viewers/broadcasters are assigned to each node), and the stream state (for example whether the stream has stopped, or is currently being broadcasted).

c. Notification System

The notification system 230 can communicate with the client system 220 to send and receive messages. For example, a user of the client system 220 can make a comment via the video app 222 while watching a video. The comment may be communicated to the notification system 230 which can process the comment, for example, by parsing the content of the comment to determine whether any inappropriate words are used, storing the comment in a data store (such as the video data store 214 or the user data store 212), and communicating the comment to multiple client systems (which may include the client system of the viewer who posted the comment and/or the broadcaster's client system). For example, the notification system can communicate with the message component 336 (shown in FIG. 3) to deliver the comment to a video app on the client system 220.

In some implementations, the notification system 230 can identify the video associated with the comment as well as the broadcaster who created the video. The notification system can communicate an alert to the broadcaster indicating that someone has posted a comment to his video. The alert may include a link to broadcaster's video or the comment page thereby allowing the broadcaster to view more details of the comment. The alert can also automatically activate the video app 222 of the client system 220 to cause the video app 222 to display the comment. Additionally or alternatively, the alert can be transmitted to other client systems. For example, when a user follows a broadcaster or a video, the notification system 230 can automatically deliver the alert to the user's video app.

In addition to or as an alternative to comments, the notification system 230 can send and receive notifications on a user's presence. For example, the notification system 230 may receive an indication from the client system 220 that the user has logged onto his account. The notification system 230 can then send a notification to client systems (which may include the client system 220) indicating this user is present.

The notification system 230 can also be configured to communicate and process other types of messages such as user interaction statistics (e.g., the number of viewers, the number of likes, etc.), availability of live streams, updates to user accounts (such as changing passwords, creating new videos, and video watching interruption errors), who has joined the stream (for viewing or broadcasting), and information about token repositories (such as updates to token repository entries, whether one or more initiation tokens and exchange tokens are available, the value of the initiation token and the exchange token, etc.), in combination or the like.

The notification system 230 can provide a low-latency messaging service. One example of the low-latency messaging service may be PubNub™ real-time publisher/subscriber messaging API. The low-latency messaging service can advantageously send real-time or near real-time messages to the client system 220.

The notification system 230 may be in communication with the video broadcasting system 240. In one embodiment, the video broadcasting system 240 can receive and process user interactions with a video stream, such as who has joined the stream, the comments made to a stream, an indication to update the token repositories, etc., at the client system 220. The video broadcasting system 240 can communicate with the user data store 212 to store updates and retrieve user information based on the received user interactions. The video broadcasting system 240 can communicate user interactions or information associated with the user interactions to the notification system 230. The notification system 230 can further generate messages and deliver them to client systems.

a. User Data Store and a Video Data Store

The user data store 212 can store information such as user information, session information, or video stream metadata, alone or in combination. For example, the user information may include user identifiers, user's personal information (e.g., address, name, bank account information, and so on), video app account information such as login credentials, and so on. The session information may include a video streaming session identifier, type of user devices used for streaming, and so forth. The video stream metadata may include video identifiers, the number of video segments in a video stream, and so on. The video stream metadata may contain links (such as in a form of a playlist) to video segments stored in the video data store 214. Additionally or alternatively, the user data store 212a can also include token repositories associated with respective users. Each token repository entry may include one or more types of tokens associated with a user of the client system 220. Details on tokens and token repositories are described below with reference to the token processing system 242.

In some implementations, the user data store 212a may be relational database. Or, the data store 212a (or any other repository or data store described herein) may be a non-relational database such as a NoSQL database. The NoSQL database may use any of a variety of data structures, such as key-value store, column store, document store, graph, and multi-model, in combination or the like. Examples of NoSQL databases may include MongoDB™, Oracle™ NoSQL database, Google™ Cloud Storage™, etc. The user data store may be hosted on one or more servers such as Google™ cloud servers. The user data store 212a may be scalable to accommodate changes in data flow.

The video data store 214 can store video data such as segments of a video file, video stream preview pictures, and so on. In some implementations, the video data store 214 may store user profile pictures (such as the profile picture of the broadcaster of a video stream). The video data store 214 may be a scalable cloud file storage. In some implementations, the video data store 214 may be hosted by cloud servers such as Google™ cloud data centers.

The video segments stored in the video data store 214 can be delivered to the client system 220 via the network 208 thereby allowing a user of the client system 220 to view the video using the video app 222. Other video data such as the stream preview image and broadcaster's profile may also be communicated to the video app 222. The delivery of the video data from the video data store 214 to the client system 220 may be implemented with either a push or a pull framework. For example, the video broadcasting system can communicate a playlist to the video app 222 on the client system 220. The playlist can include list of video segments of a video stream. The video app 222 can use the links on the playlist to request—or pull—the video segments from the backend streaming system 210a. As another example, when the backend streaming system 210a receives new video segments and/or updates the playlist, the backend streaming system can push the new video segments from the video data store 214 to the client system 220.

Either or both data stores may store additional or different types of information listed herein. For example, a portion of the user data may be stored in the user data store 212 while another portion is stored in the video data store 214. Additionally or alternatively, some information listed as to be stored in the user data store 212 may be stored in the video data store 214. Similarly, certain information listed as to be stored in the video data store 214 may actually be stored in the user data store 212.

b. Content Delivery Network

In some embodiments, the video data may be delivered by a content delivery network (CDN) 260 to the client system 220 via the network 208. This delivery technique may be particularly advantageous when a faster content delivery is desired.

FIG. 2B depicts a computing environment 200b for delivering video data via a content delivery network 260. Similar to the computing environment 200a depicted in FIG. 2A, the computing environment 200b includes a backend streaming system 210b and a client system 220 in communicate with the network 208. The backend system 210b includes a user data store 212, a video data store 214, a notification system 230, a video broadcasting system 240, and video processing system 250, where each of these components are described with reference to FIG. 2A.

The computing environment 200b can also include a CDN 260. The CDN 260 can communicate with various backend components and the client system 220 (including the video app 222) via the network 208. The CDN 260 can have a group of distributed servers which can deliver the video data to various client systems. The delivery route may be based on factors such as the geographical locations of viewer's computing devices and/or the broadcaster's computing device, as well as the locations of the CDN servers.

Although in FIG. 2B, the CDN 260 is shown as outside of the backend streaming system 210b, in some implementations, the CDN 260 may be part of the backend streaming system 210b. Moreover, in certain embodiments, the CDN 260 can implement any of the CDN features or other features described in U.S. Pat. No. 8,489,731, filed Aug. 20, 2009, titled "Content Delivery Network With Customized Tracking of Delivery Data," the disclosure of which is hereby incorporated by reference in its entirety.

IV. Example Client System

Figure 3:
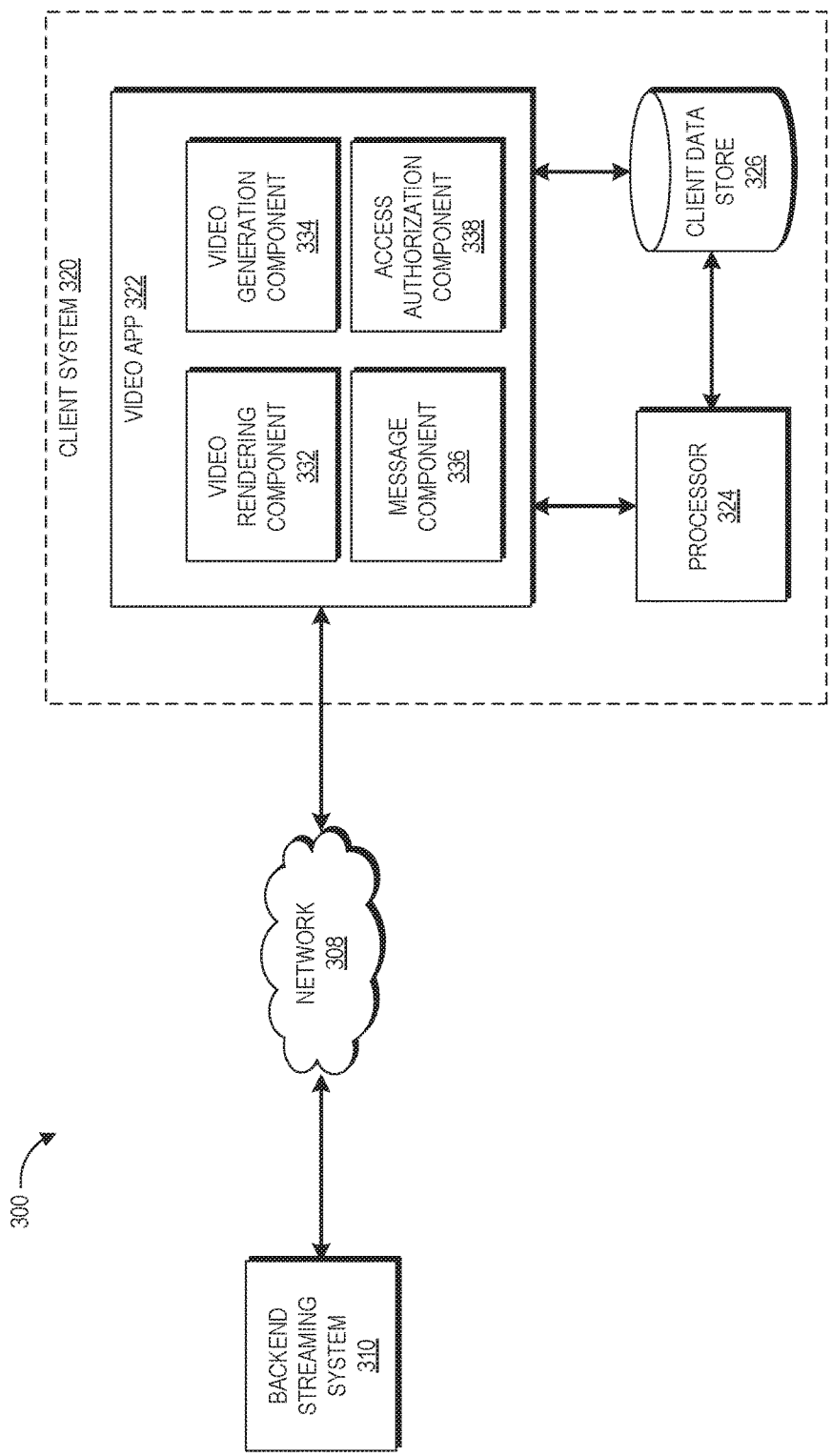
FIG. 3 depicts an example of a client system.

FIG. 3 depicts a computing environment 300 including an example client system 320. In the computing environment 300, the backend streaming system 310 can communicate with a client system 320 via the network 308. The backend streaming system 310 is an embodiment of the backend streaming systems 110, 210a, and 210b. The network 308 is an embodiment of the network 108, 208.

Similarly, the client system 320 is a more detailed embodiment of the computing devices or client systems 104, 120, 220. For example, as further described herein, a user (e.g. a broadcaster or a viewer) can create video on the client system 320 and communicate the video to the backend streaming system 310 via the network 308. The backend streaming system 310 can process the video and stream the video to other computing devices. In some implementations, the client system 320 can view the video created on its own.

The client system 320 may include a video streaming app 322, a processor 324, and a hardware client data store 326. The processor 320 can communicate with the video app 322 and the client data store 326. For example, the processor can execute various components of the video app 322 and store the video data as well as user data in the client data store 326. Although not shown in FIG. 3, the video app 322 may be stored in a memory device (e.g., random access memory) and executed by the processor 320.

The video streaming app 322 may include a video rendering component 332, a video generation component 334, a message component 336, and an access authorization component 338. One or more of these components can communicate directly with the backend streaming system 310. However, in some embodiments, the video app 322 may include a main processing component (not shown) which coordinates the various components of the video app 322 and handles communications with the backend streaming system 310.

Figure 16:
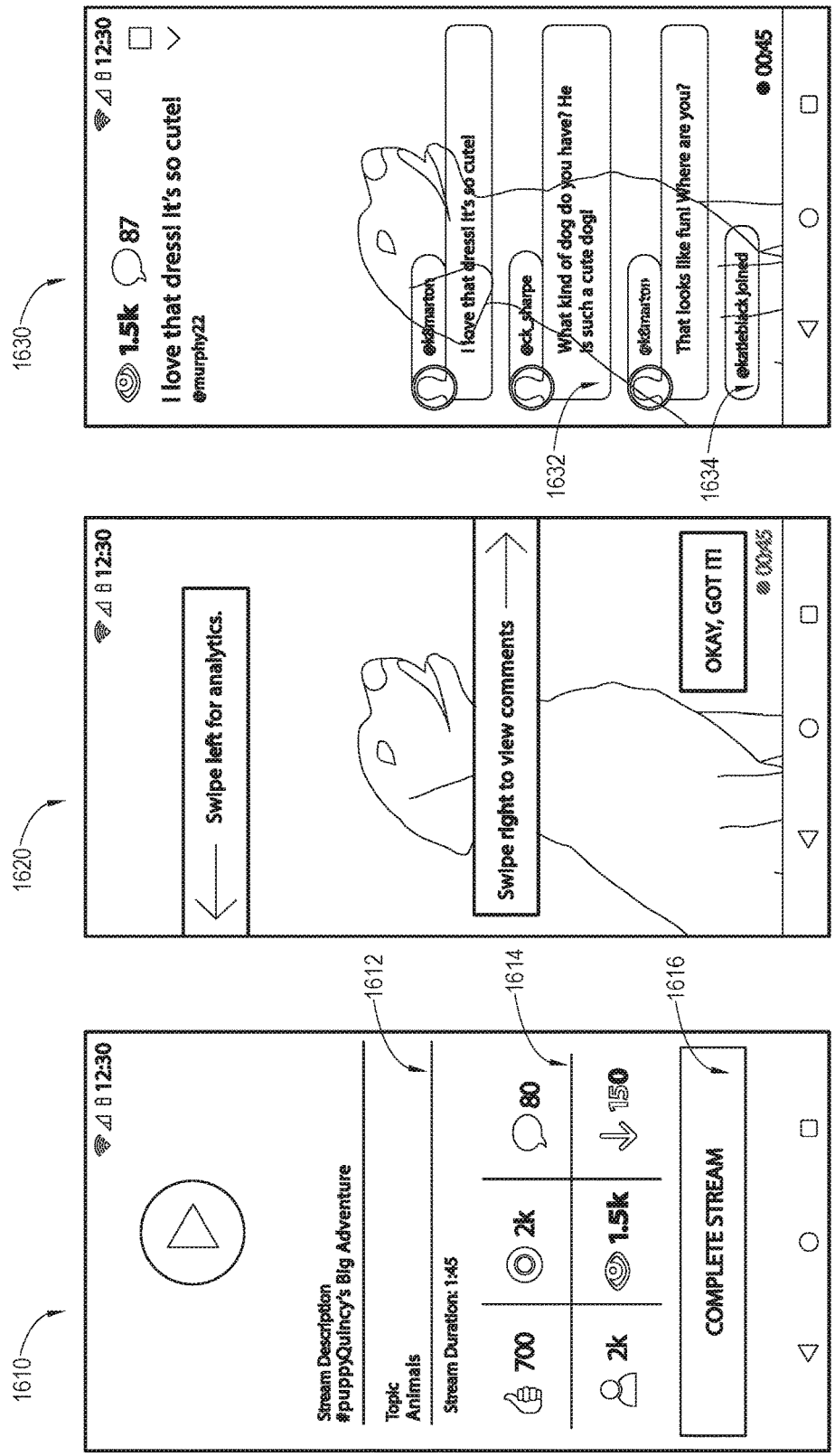
FIG. 16 depicts example user interfaces for viewing video analytics and comments.

The video rendering component 332 can generate user interface elements to play the video stream. For example, the video rendering component 332 can receive a video stream from the backend streaming system 310 and update a user interface on the viewer's mobile computing device to play the video stream. In some implementations, the video rendering component 332 can also be configured to show other data such as video preview, video analytics, and the viewer/broadcaster's information. Additional examples of user interfaces for the video rendering component 332 are shown in FIGS. 16, 20, and 20B.

The video generation component 334 of the video app 322 can create a video stream. For example, the video generation component 334 can access the audio and video input hardware such as a microphone and a camera of the broadcaster's computing device to record a video of an event. The event may relate to the broadcaster and/or the broadcaster's environment. The broadcaster can also add additional information to the video. For example, the broadcaster can add tags (on the topic of the video) and set the level of access (whether the video is associated with an access token). If the video is associated with one or more access tokens, the broadcaster can set the amount of access tokens. In some implementations, the broadcaster can also set one or more share tokens for those viewers who share the video.

In some implementations, the video generation component can allow a user to schedule live streams. For example, the user may configure the information associated with the live stream such as time, location, duration, topic, broadcaster, and so on. When it is the scheduled time for the live stream, the user can record and broadcast the video in real-time.

The video generation component 334 can communicate the recorded video and other information of the video to the backend streaming system 310. The backend streaming system 310 can process the video and deliver the video to the viewers via live streaming or VOD. Additional example user interfaces related to the video generation component 334 are further described with reference to FIGS. 14A, 14B, and 15.

A user of the client system 320 can use the message component 336 to communicate with other users. For example, the user can make a comment to the video stream, add descriptions to the video stream, or chat with other users, in combination or the like, through the message component 336. The message component 336 can communicate the message to the backend streaming system 310. The backend streaming system 310 can process the message and deliver the message to multiple client systems.

The message component 336 can also receive notifications regarding user interactions. For example, the message component 336 may display a message indicating to a broadcaster who the user is following has logged on. The message component 336 can also receive real-time comments of a video from the backend streaming system 310. The message component 336 can communicate with the video rendering component 332 to display the comments. Additional examples associated with the message components are shown in FIGS. 16 and 20B.

In some situations, video app 322 may be executing in the background of the client system 320 while the user is interacting with other applications of the client system 320. However, when the message component 336 receives an alert from the backend streaming system 310 that a scheduled live stream is about to begin, the message component 336 can activate other components of the video app 322 to show the live stream. This implementation may be advantageous because the user may not remember at what time the live stream is scheduled for and therefore may join the live stream late. By automatically activating the video app 322, the user may be able to start viewing the live stream on time. The app 322 can be invoked manually by the user in other embodiments.

Figure 21:
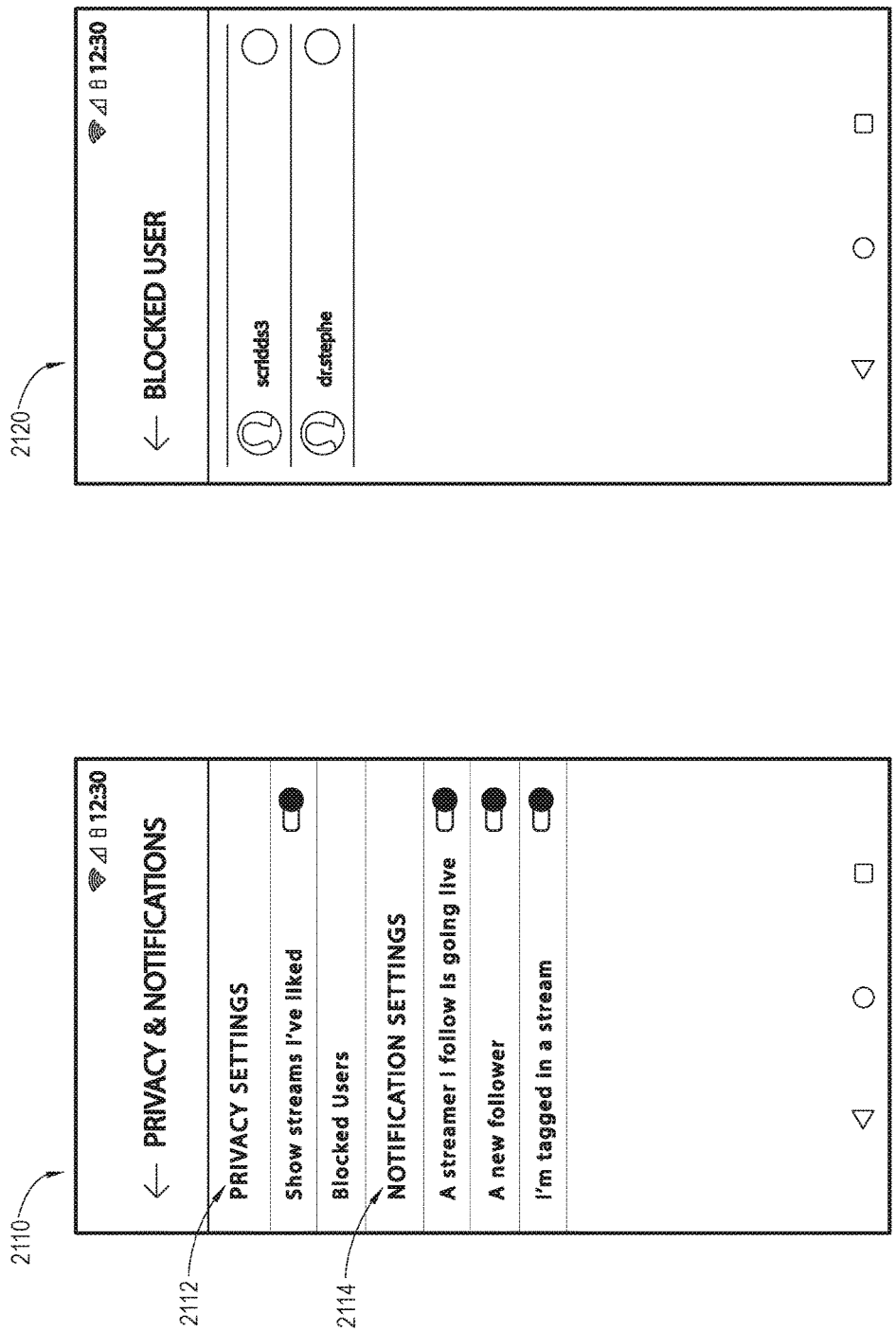
FIG. 21 depicts example user interfaces which allow a user to configure security settings of his account.

The access authorization component 338 can allow a user to set privacy and notifications, as well as block certain users. Example user interfaces on these functions are shown in FIG. 21. The access authorization component 338 can also communicate with the backend streaming system 310 to authenticate a user. For example, the access authorization component 338 can communicate with the backend streaming system 310 to determine whether the login credentials are correct.

In some implementations, the access authorization component 338 can also be used to determine whether a user has a met a threshold condition to access a video stream. For example, the access authorization component 338 can communicate with the backend streaming system 310 to determine whether a value of one or more access tokens in the user's token repository entry, or a combination is greater than the amount of access tokens for the video stream.

Although in this example the video streaming app 322 includes four components, the video streaming app 322 is not required to have these four components. The video streaming app 322 may include more or fewer components. In some embodiments, on component may be part of another component. For example, the access authorization component 338 may be part of the video rendering component 332 and/or the video generation component 334.

V. Example Video Stream Recording Process

Figure 4:
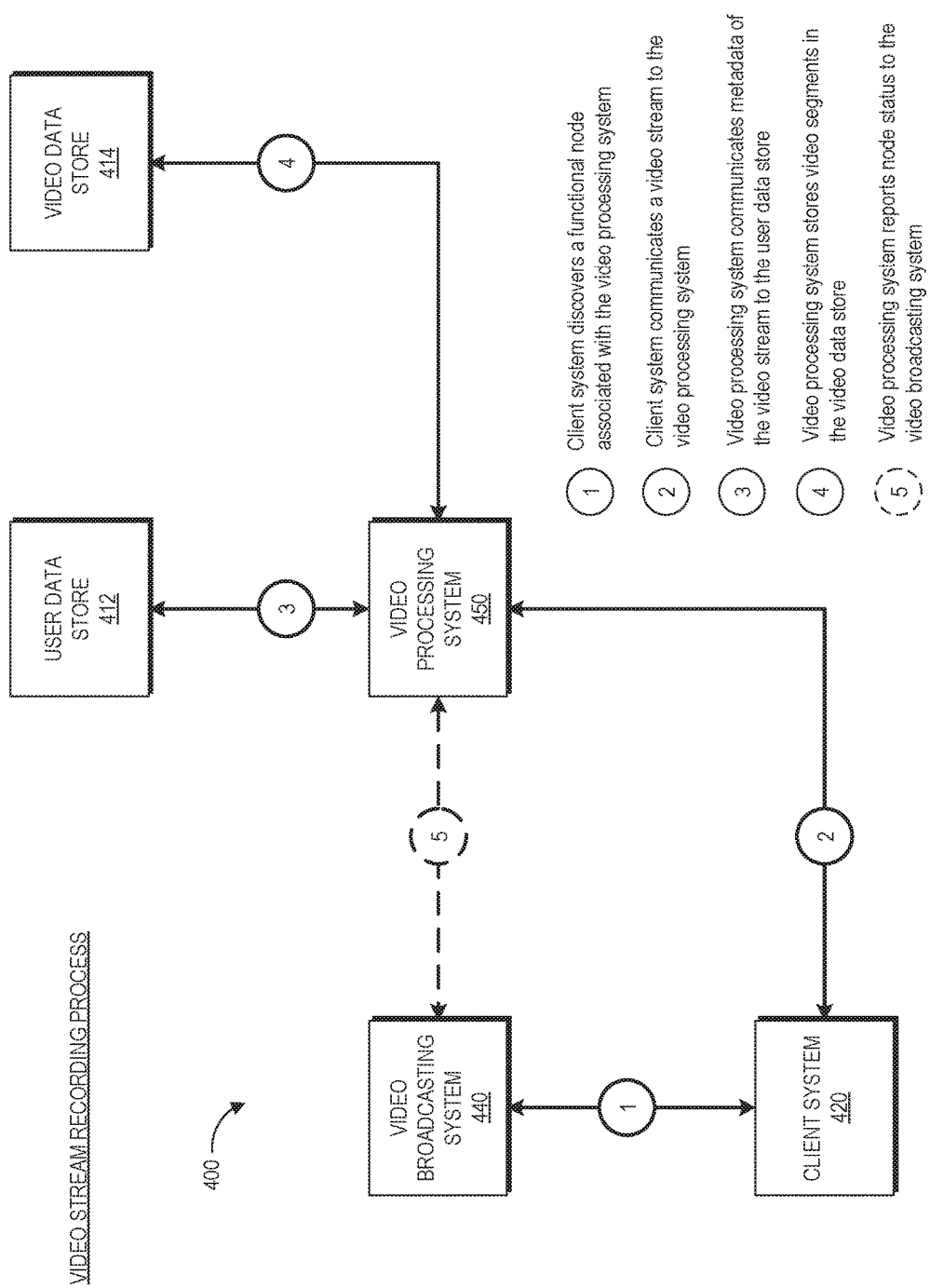
FIG. 4 depicts an example of a video stream recording process.

FIG. 4 depicts an example of a video stream recording process. In the example process 400, the client system 420 is an embodiment of the client systems 104, 120, 220. Other systems shown in FIG. 4 may also be embodiments of their respective systems described in FIGS. 2A and 2B and may have the same or similar functionality as described elsewhere herein.

At step 1 of the process 400, the client system 420 can communicate with the video broadcasting system 440 to discover whether a node (physical or virtual) in the broadcasting system 440 has network connection and capacity for transmitting video data. In some implementations, the available node is also referred to herein as a functional node). As described with reference to FIG. 2A, the video broadcasting system 440 may keep a current list of functional nodes. This list may be updated based on information reported by the video processing system 450. In some implementations, this list may be stored in a data store such as the user data store 412. As a result, the video broadcasting system 412 can communicate with the user data store 412 to discover and update the list of operational nodes.

The client system 420 (such as the video app installed on the client system 420) may receive information of the functional node from the video broadcasting system 440. The client system 420, at step 2, can send a video stream to the selected node. The video stream may be sent via any suitable streaming protocol (or protocols), such as the Real-Time Messaging Protocol (RTMP) or the Real Time Streaming Protocol (RTSP) described in Request for Comments (RFC) 2326, from the client system 420 to the video processing system 450. The video processing system 450 can process incoming video data to generate video segments, and the video processing system 450 can store the video data to the data stores such as at the user data store 412 (step 3) and the video data store 414 (step 4). For example, the video processing system 450 can generate video segments from the video data and push the video segments to the video data store 414 at step 4. The video processing system 450 can also generate a playlist for the video stream segments. The video processing system 450 can write video stream metadata, such as the playlist information, to the user data store 412.

More than one playlist may be produced for one video stream. For example, one playlist may be associated live streaming of the video stream while another playlist may be associated with VOD. The list for live viewing may consist of smaller segments (such as multiple 1 second video segments) which are better suited for live viewing because it reduces viewer latency. The list for VOD may have larger segments (e.g., 15 seconds segments) which can reduce overhead on the backend servers while it is generating the playlist as well as reduce bandwidth design goals and computing resources on the client systems for viewing the video stream. Furthermore, to reduce storage usage, the live video playlist and its associated video segments may be removed from the backend streaming system after a retention period. In some embodiments, the retention period may last until the end of the scheduled live video stream session.

In some situations, a user may generate multiple video streams for a single streaming session. For example, a user may pause a recording and then resume the recording of a video. As a result, the client system 420 may first upload a portion of the recording (before the pause) and then upload another portion of the recording (after the user resumes). In these situations, the video processing system 450 may nevertheless combine these two uploads into a single playlist. For example, the video processing system 450 may create a playlist based on the first upload and then update the playlist to include the video segments from the second upload.

Optionally at step 5, the video processing system 450 can notify the video broadcasting system 440 the node status. For example, the video processing system 450 can report the capacity of the nodes associated with video processing as well as whether one or more nodes have functional errors (such as lost network connections).

One or more components involved in the process 400 may be scalable (up or down), for example, based on the network traffic. For example, the video processing system 450 may include virtual machine instances which can be expanded or reduced based on, for example, CPU utilization rate. The user data store 412 and the video data store 414 may also be implemented as in a cloud database to increase scalability.

VI. Examples of Video Stream Broadcasting Process

Figure 5:
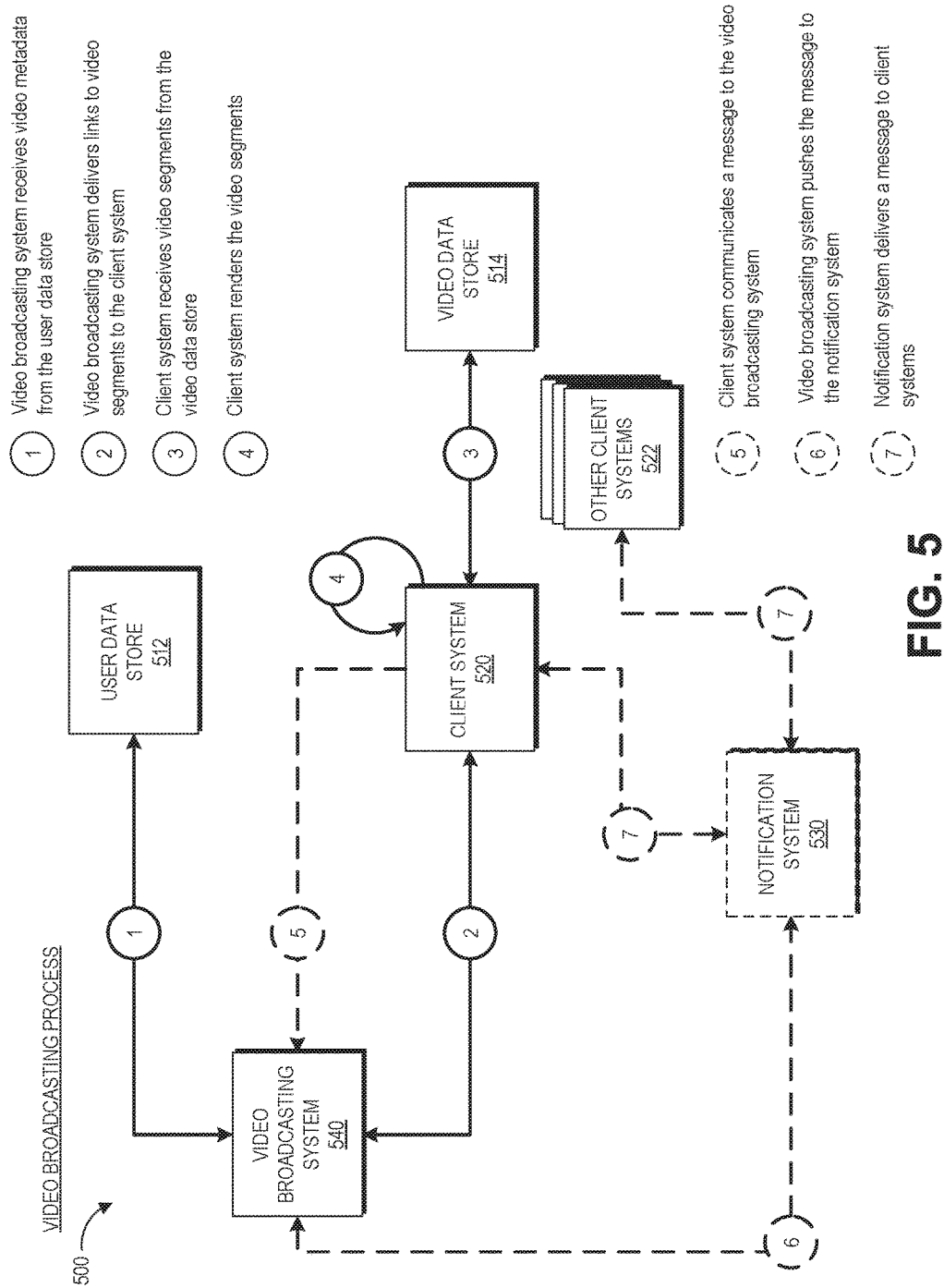
FIG. 5 depicts an example of video broadcasting process and an example of user interactions with a video stream.

FIG. 5 depicts an example video broadcasting process and an example of user interactions with a video stream. In the example process 500, the client systems 520 and 522 may be embodiments of the client system 220 shown in FIGS. 2A and 2B. The client system 520 may be part of the broadcaster computing device 104 (shown in FIG. 1) while the other client systems 522 may be part of the viewer computing device 120 (shown in FIG. 1). Other systems shown in FIG. 5 may also be embodiments of their respective systems described in FIGS. 2A and 2B and may have the same or similar functionality as described elsewhere herein.

To view a video stream, the client system 520 can communicate with the video broadcasting system 540 to request for the video playlist. At step 1, the video broadcasting system 540 can communicate with the user data store to retrieve the video metadata (such as the video playlist). At step 2, the video broadcasting system 540 delivers the video playlist to the client system 520. This video playlist can consist of video segment links generated when the video processing system processes the video stream uploads from the broadcaster computing device. In some embodiments, if the video is streamed under VOD, the playlist may include links to all video segments of the entire stream. Therefore the client system 520 may make one call to the video broadcasting system 540. If the video is streamed live, the playlist may contain links to the most recent segments.

Therefore, the client system 520 may keep polling the backend streaming system for new video segments until the stream ends.

At step 3, the client system 520 can retrieve video segments from the video data store 514 using the playlist. As described with reference to FIG. 2B, the video data may be delivered to the client system via a CDN in some implementations.

At step 4, the client system 520 can render the video segments. For example, with reference to FIG. 3, the video rendering component 332 of the video app 322 can generate or update a user interface on the client system 320 to play the video segments in sequence.

In some situations, the protocols for video uploading and video streaming may differ. For example, the protocol used to communicate a video from a client system to the backend streaming system (such as to the video processing system) may be RTMP while the protocol used for streaming the video from the backend system (such as from the video broadcasting system 540) may be HTTP live streaming (HLS). In these situations, the backend streaming system can convert the protocols prior to delivering to the client systems. For example, the video broadcasting system 540 may convert the video streams to the HLS before transmitting the video streams to the client system. In certain embodiments, other backend systems, such as the video processing system, can also perform such conversion.

In some embodiments, the viewer can create a message (such as a comment) on the viewer's computing device and communicate such message to the backend streaming system. For example, at step 5, the video app on the client system 520 can communicate a user's comment to the video broadcasting system 540. At step 6, the video broadcasting system can communicate (push or pull) the comment to the notification system 530. The notification system 530 can generate an alert with the comment and deliver the alert to multiple client systems at step 7. For example, the notification system 530 can deliver the alert to the same client system 520 which generates the message as well as to other client systems 522.

One or more components involved in the process 400 may be scalable (up or down), for example, based on the network traffic. For example, the video broadcasting system 540, the user data store 512, and the video data store 514 may also be implemented on cloud servers to increase scalability.

VII. Examples of Video Streaming with Interrupt Detection

Figure 6:
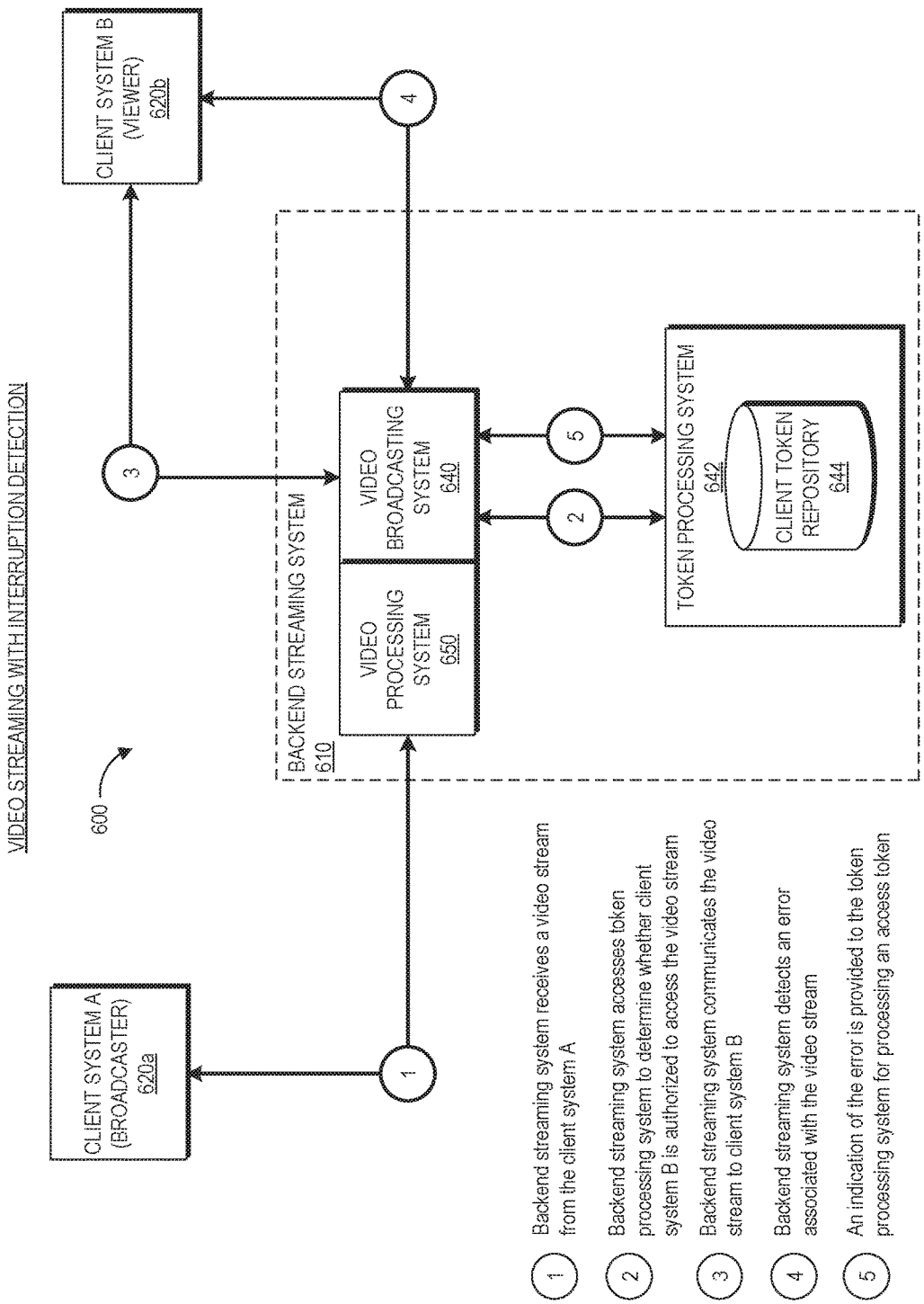
FIG. 6 depicts an example of broadcasting a video stream with an interruption detection process.

FIG. 6 depicts an example of broadcasting a video stream with an error detection process. In the example process 600, the client systems 620a and 620b may be embodiments of the client system 220 shown in FIGS. 2A and 2B. The client system A 620a may be part of the broadcaster computing device 104 (shown in FIG. 1) while the client system B 620b may be part of the viewer computing device 120 (shown in FIG. 1). Other systems shown in FIG. 6 may also be embodiments of their respective systems described in FIGS. 2A and 2B and may have the same or similar functionality as described elsewhere herein.

In the process 600, a broadcaster can create a video stream using a first client, the client system A 620a. The broadcaster can specify metadata associated with the video stream such as descriptions of the video stream and one or more access tokens for viewing the stream.

At step 1, the client system A 620a can upload the video stream to the backend streaming system 610, such as to the video processing system 650 of the backend streaming system 610. While receiving the video stream from the client system A 620a, the video processing system 650 can calculate the total duration of the video stream and store this information in a video data store (e.g. video data stores 214, 414, and 514). The video processing system 650 can refresh the playlist of the video segments to reflect the total duration of the video stream as the video processing system 650 receives the video stream from the client system 620a. For example, during a live video streaming, as the video processing system 650 receives the video stream from the broadcaster, the video processing system 650 can automatically update the playlist to include newly received portions of the video stream and to increase the total duration accordingly. In some embodiments, where the client system A 620a can pause the video stream for a duration and then resume the video stream. The video processing system 650 may exclude the duration of pause from the total duration of the video stream.

At step 2, the video broadcasting system 640 can communicate with the token processing system 642 to determine whether the client system B 620b has met a threshold condition for accessing the video stream uploaded by the client system A 620a. For example, the client system B 620b may be authorized to access the video stream if the client system B 620b has provided one or more access tokens (e.g., the one or more access tokens provided by the client system B 620b has sufficient value to meet the token criterion specified by the client system A 620a). If the client system B 620b has met the threshold condition, the video broadcasting system 640 can communicate the video stream to the client system B 620b at step 3. For example, the video broadcasting system 640 can communicate a playlist of the video segments to the client system B 620b and the client system B 620b can download the video segments from a video data store.

At step 4, the video broadcasting system 640 may detect an error associated with the video stream. The error may occur at step 1 and/or step 2 in the process 600. For example, the video broadcasting system 640 can identify the total duration of the video stream as calculated by the video processing system 650. If the total duration of the video stream is less than a threshold duration (such as 60 seconds), the video broadcasting system 640 may provide an indication of an error. As another example, the video processing system 650 may have received a portion of the video upload from the client system A 620a, for example, due to errors in network connections between the client system A 620a and the backend streaming system 610. As yet another example, the video broadcasting system 640 may lose connection with the client system B 620b in the middle of the video stream. As a result, the backend streaming system 610 delivers a portion of the video segments on video playlists to the client system B 620b. This lost in connection may be reported by the client system B 620b or be detected by the video broadcasting system 640. For example, the video broadcasting system 640 may discover this error when the client system B 620b repeatedly requests the same video segment from the video data store. As another example, the video broadcasting system 640 may count the bits of video data delivered and if the number of bits is less than a threshold amount (e.g., a portion of the video data is missing), the video broadcasting system 640 may flag the error).

At step 5, the video broadcasting system 640 can communicate the error to the token processing system 642, although in some implementations, the video broadcasting system 640 can also communicate the errors to the client systems A (620a) or B (620b), or other systems of the backend streaming system 610. In some implementations, the video broadcasting system 640 may perform the error detection process 600 within a threshold duration of time. For example, assuming the threshold period of time is 60 seconds, the video broadcasting system 640 can provide the indication of the error to the token processing system 642 when an interrupt to video stream is detected in the first 60 seconds of the video. If an error is detected after the first 60 seconds, the video broadcasting system 640 may be configured not to inform the token processing system 642.

The token processing system 642 can accordingly update the token repositories associated with the client system A 620a and the client system B 620b. For example, at step 2, the video broadcasting system 640 can determine whether the client system B 620b has been authorized to access the video stream. For example, the video broadcasting system 640 can determine whether the client system B 620b has provided one or more access tokens with sufficient values to access the video stream. Once the video broadcasting system 640 determines that the client system B 620b has been authorized to access the video stream, the video broadcasting system 640 may update the token repository entry associated with the client system A 620a to include the values of the one or more access tokens for the video stream. The video broadcasting system 640 can also update the token repository entry associated with the client system B 620b to deduct the values of the one or more access tokens, thereby transferring the values of the access tokens from the entry of the token repository of the client system B 620b to the entry of the token repository of the client system A 620a. As described with reference to the token processing system 242 shown in FIG. 2, the access token(s) may be composed of initiation tokens, exchange tokens, or a combination. The video broadcasting system 640 can transfer the values of initiation tokens, the exchange tokens, or the combination from the token repository entry of the client system B 620b to the token repository entry of the client system A 620a.

If the token processing system 642 has received an indication of an error, the token processing system 642 may revert its previous processing of the access token(s). For example, the video broadcasting system 640 may update the token repository entry associated with the client system B 620b to include the amount of access tokens previously removed while removing the amount of access tokens from the token repository entry associated with the client system A 620a.

In addition to or in alternative to provide the indication of the error to the token processing system 642, the video broadcasting system 640 may send an instruction to the token processing system 642 causing the token processing system 642 to update the token repositories based on the error. For example, the token video broadcasting system 640 can instruct the token processing system 642 to restore the access token(s) to its original state prior to the error where the amount of the access token(s) (or the amount of the initiation tokens and the exchange tokens) are transferred back from the token repository entry of the client system A 620a to the token repository entry of the client system B 620b.

In some implementations, if the total duration of the video upload is less the threshold duration, the video broadcasting system 640 may instruct the token processing system 642, at step 5, to withhold from processing the access token(s) for the video stream until the total duration of the stream has exceeded the threshold duration.

Although the examples described in FIG. 6 are with reference to error detection, the process shown in FIG. 6 may also be applied to situations where the total duration of the video provided by the broadcaster is less than a threshold duration. For example, a broadcaster may stream a live video for 50 seconds when the threshold duration is 60 seconds. The video broadcasting system can detect that the total duration of the video stream is less than 60 seconds by calculating the total length of the data represented on the playlist. If the access token(s) has already been processed and the total duration is less the threshold duration, the token processing system can restore the access token(s) to its original state.

Figure 7:
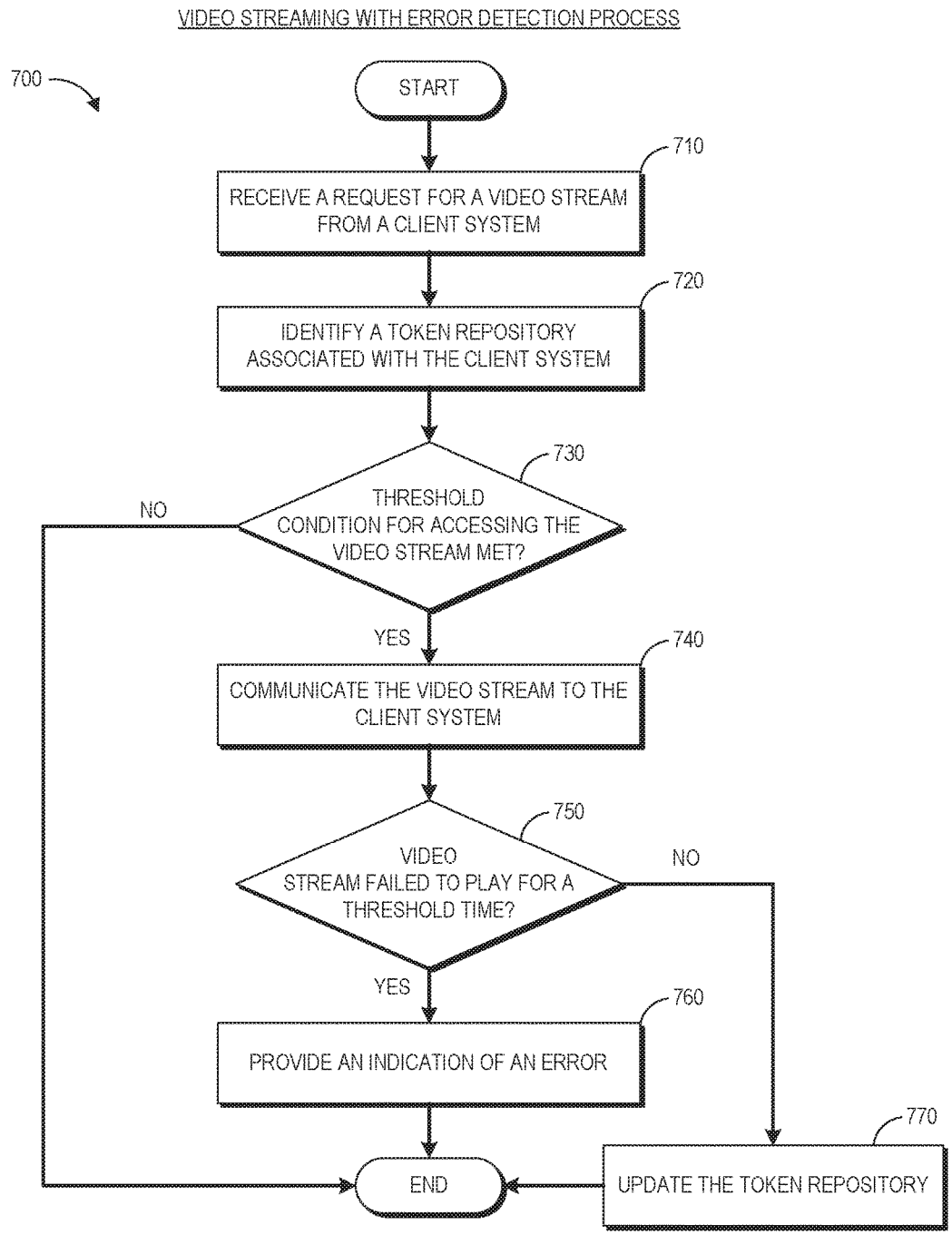
FIG. 7 depicts an example process of broadcasting a video stream where an error is encountered.

FIG. 7 depicts an example process of broadcasting a video stream where an error is encountered. The process 700 may be performed by backend streaming systems 110, 210a, 210b, 310, 810 or one or more systems of the backend streaming systems.

At block 710, the backend streaming system receives a request for a video stream from a client system. The video stream may be a live video stream or a VOD.

At block 720, the backend streaming system can identify a token repository entry associated with the client system. For example, the token processing system of the backend streaming system may identify a token repository entry of the client system based on the identifier of the client system. The token repository entry may be used to store access tokens.

At block 730, the backend streaming system can determine whether the client system has met a threshold condition for accessing the video stream. For example, the backend streaming system can determine whether the value of the one or more access tokens in the token repository entry is sufficient for accessing the video stream as specified by the broadcaster. If the threshold condition is not met, the process 700 may end, although in some implementations, the backend streaming system may send an indication to the client system informing the client system that it has not met the threshold condition.

If the client system has met the threshold condition, at block 740, the backend streaming system can communicate the video stream to the client system. For example, the video broadcasting system can communicate a playlist of video segments to the client system. The client system can retrieve each segment from a video data store based on the playlist.

At block 750, the backend streaming system can determine whether the stream failed to play for a threshold duration of time. For example, the backend streaming system or the client system can detect a connection error between the backend streaming system and the client system, causing the client system to not receive all video segments. As another example, the backend streaming system can calculate and update the overall duration of the video stream as the broadcaster is uploading the video stream. If the upload is interrupted or if the overall duration of the upload is less than a threshold duration, the backend streaming system can provide an indication of an error, for example, to a token processing system, at block 760 to restore the access token(s) to its original state prior to the error. In some implementations, the backend streaming system can provide an instruction to the token processing system causing the token processing system to restore the access token(s).

If no errors were detected, the backend streaming system may update the token repository entry associated with the client system. For example, the backend streaming system may remove the amount of access tokens used to access the video stream from the token repository entry of the client system. The backend streaming system can also update the token repository entry associated with a broadcaster to reflect the amount of access tokens.

In some implementations, during live video stream, the backend streaming system may choose not to transfer the access token(s) from a token repository entry associated with the client system to a token repository entry associated with the broadcaster unless the threshold duration of time is met.

VIII. Example Video Sharing Processes

Figure 8A:
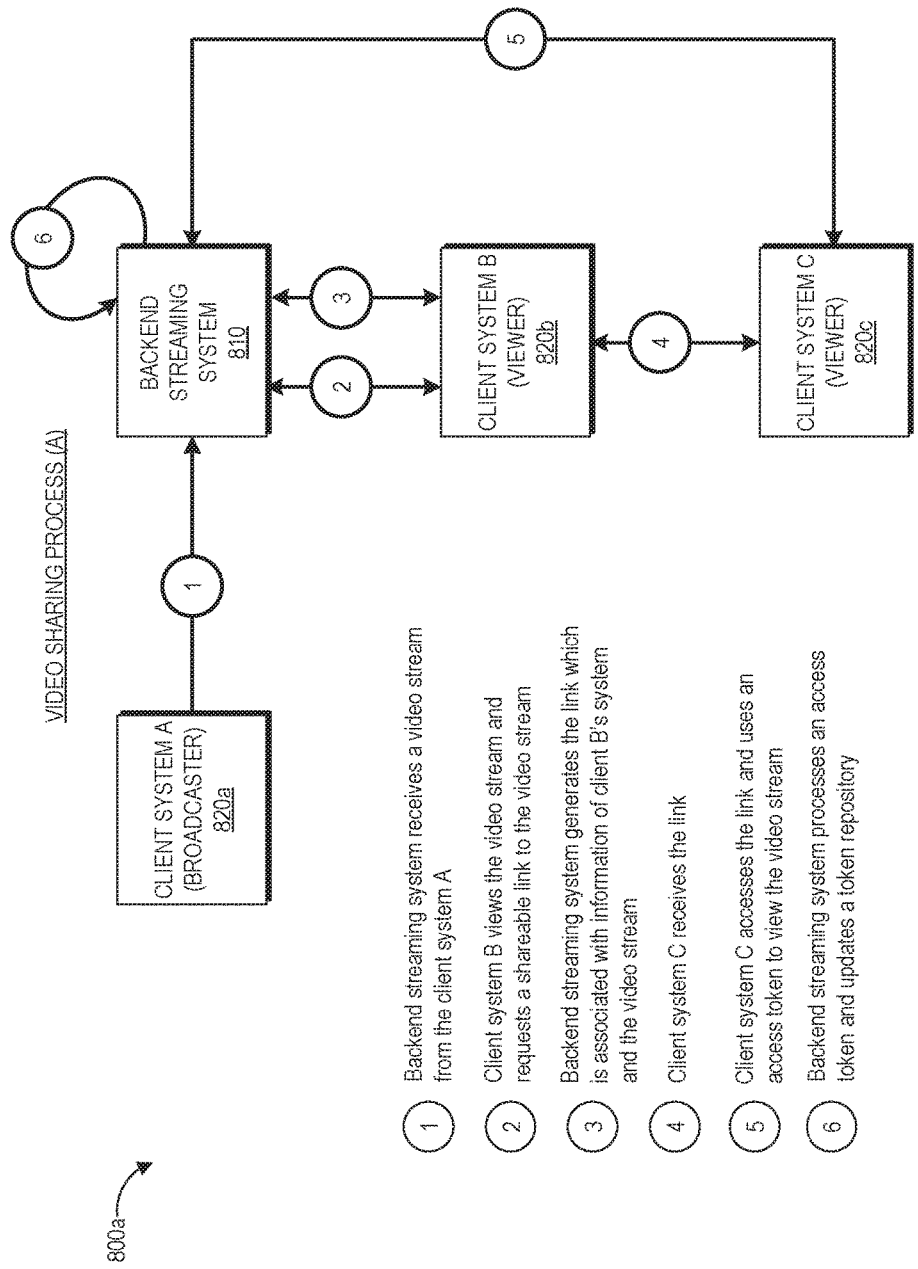
FIGS. 8A, 8B, and 9 depict examples of video sharing processes.
Figure 8B:
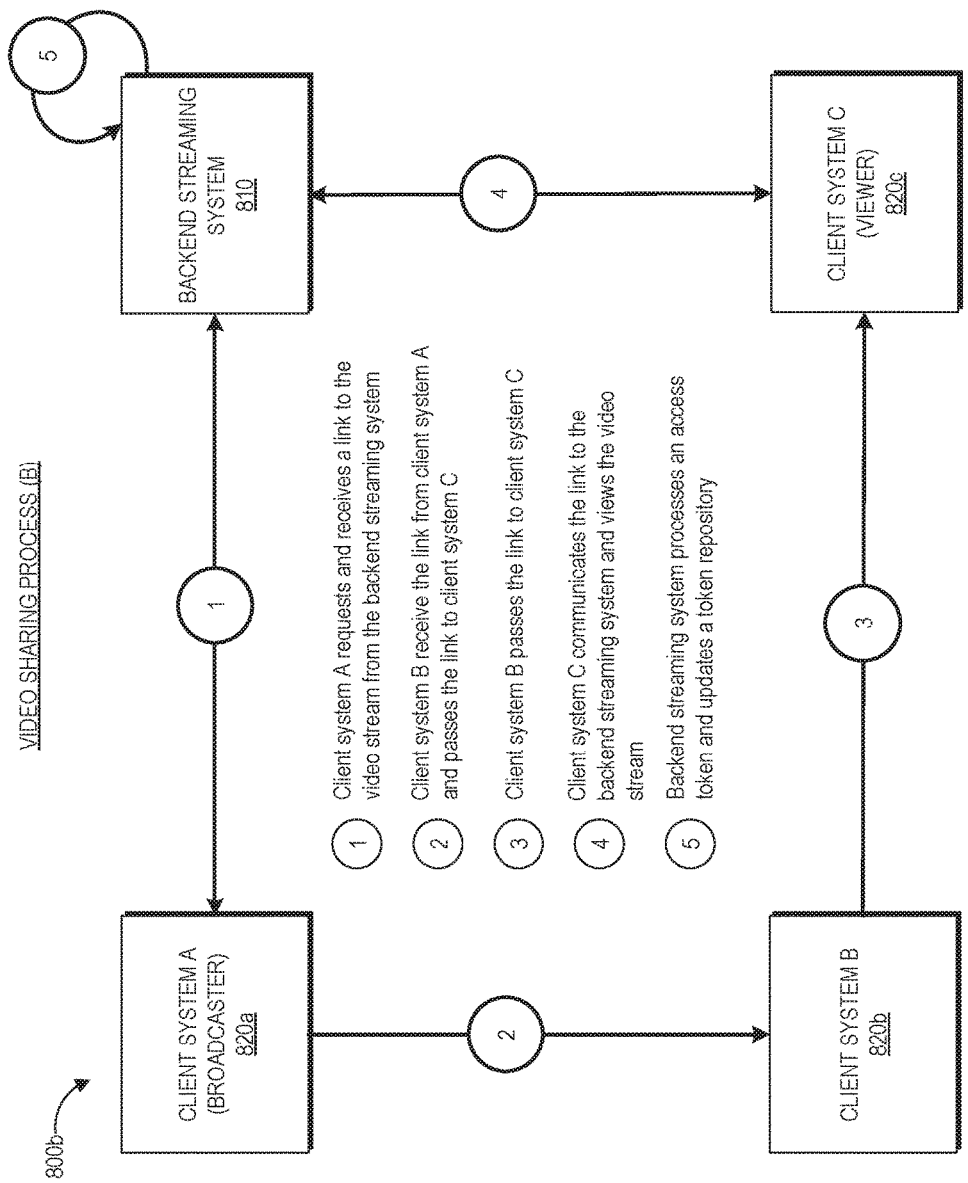
Figure 9:
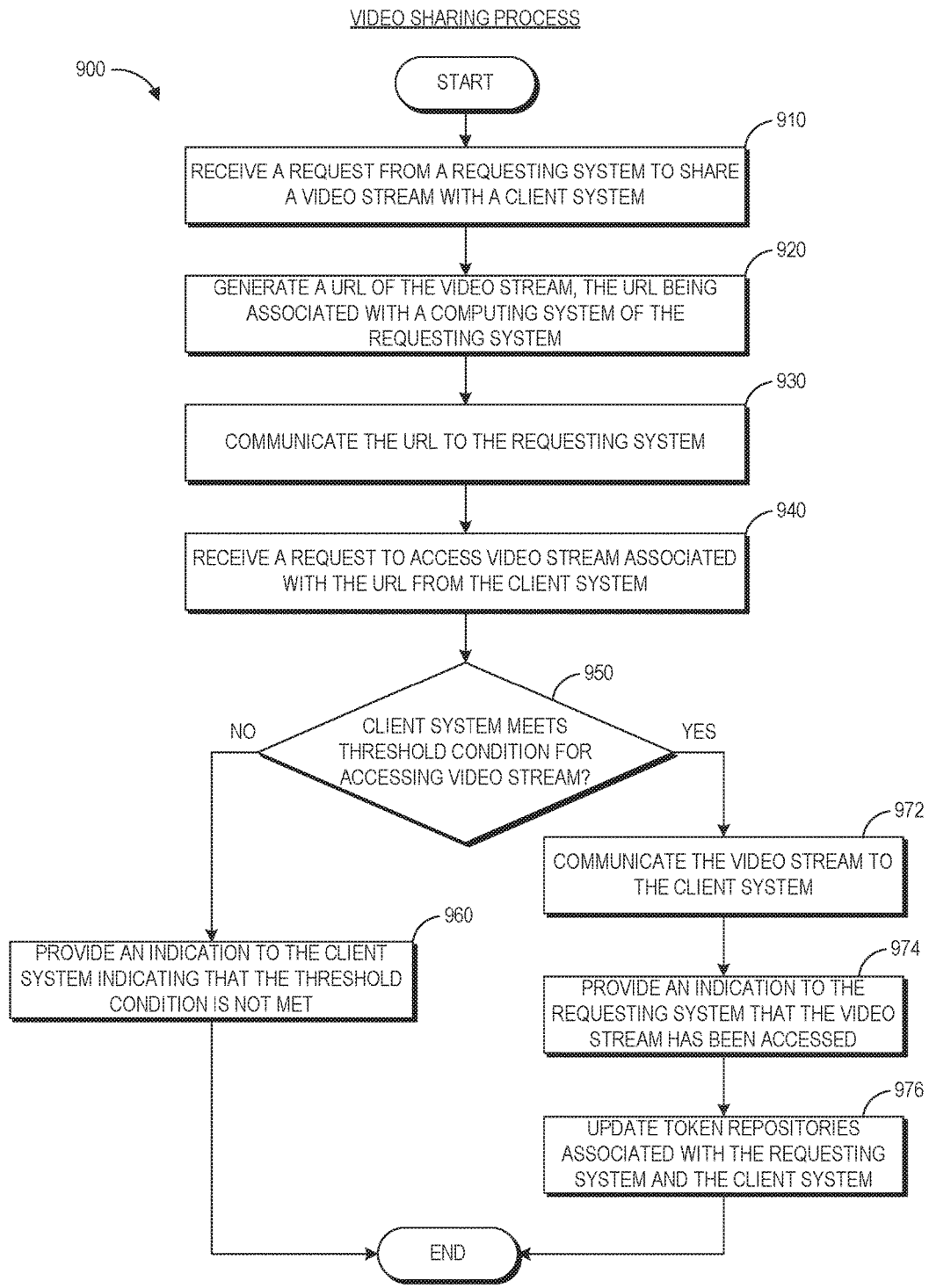

FIGS. 8A, 8B, and 9 depict examples of video sharing processes. The client systems A, B, and C (820*a*, 820*b*, and 820*c*) are embodiments of the client systems 102, 120, 220, and 320, and the backend streaming system 810 is an example of the backend streaming systems 110, 210*a*, and 210*b*. At step 1 of the process 800*a*, the client system A 820*a*, which may be associated with a broadcaster, can create a video and stream it to the backend streaming system 810. As described below with reference to FIGS. 14A and 14B, the broadcaster can provide a description of the video stream, as well as specify whether one or more access tokens are used to view the stream and whether a viewer who shares the link will receive any share tokens. For example, the broadcaster may specify the amount of share tokens to be a certain portion of the amount of access tokens.

The backend streaming system 810 can process the received video stream. As described above with reference to FIGS. 2A, 2B, and 4, the backend streaming system can identify the metadata of the video stream and store the metadata in one or more data stores. The metadata may include a video identifier, broadcaster identifier, the amount of access tokens, the amount of share tokens, and so on. The backend streaming system can also split the video stream into multiple segments and generate a playlist associated with the video segments. The viewer's computing device (such as the client system B 820*b*, and the client system C 820*c*) can use the playlist to download the video segments.

The backend streaming system 810 can broadcast the video stream to the client systems, such as the client system B 820*b*, as a VOD or as a live stream.

The viewer of the client system B 820*b* may decide to share the video stream with other users. The viewer can request a shareable link to the video stream at step 2. The backend streaming system 810 can generate the link and communicate the link to the client system B 820*b*. The link may be generated based on metadata of the video as well as based on information of the client system B 820*b*. For example, the client system B 820*b* may send an identifier of the client system B 820*b* and/or an identifier to the video to the backend streaming system 810 at step 2 when it requests the link. In some implementations, the client system B's 820*b* request is not required to include the identifier of the client system B 820*b* or the identifier of the video. Rather, the backend streaming system 810 can automatically identify which client system requests sharing of which video based on information previously obtained (such as cached or stored in the data store) by the backend streaming system 810. Additionally, the backend streaming system 810 can retrieve the metadata of the video from the data store and associate the metadata of the video as well as the client system B's 820*b* information in the shareable link.

The backend streaming system 810 can encode the identifier of the client system B 820*b* (and/or video metadata) in a string. The backend streaming system may include the string as part of the shareable link to be passed to other client systems. As an example, a shareable link may be like the following or some variant thereof: "<video.com>/<encoded string>". When the backend streaming system 810 receives a request associated with this link, the backend streaming system 810 can parse and decode the encoded string to identify the client system B 820*b* (which has shared the link), and/or the video and the broadcaster. Additionally or alternative, the sharable link may include the identifier to the client system B 820*b* itself (and/or a portion of the video metadata). For example, the sharable link may be like the following or some variant thereof: "<video.com>/<video id>/<client system B's id>".

In some implementations, the backend streaming system 810 can format the link as a uniform resource locator (URL) and return the URL to the client system B 820*b* at step 3. At step 4, the client system B 820*b* can share the link with other client systems (such as client system C 820*c*). The client system B 820*b* can share the link with the client system C 820*c* using, for example, social networks, the video app, or other communication channels such as emails or text messages.

Once the client system C 820*c* receives the link, the viewer of the client system C 820*c* can click the link which may activate a browser on the viewer's computing device or the video app to send a request to the backend streaming system 810 open the page associated with the link as shown in step 5.

In some implementations, in response to the request from the client system C 820*c*, the backend streaming system 810 can determine whether the viewer's computing device has already installed the video app. For example, the backend streaming system 810 can determine whether the request comes from a browser or from the video app. If the request comes from the browser, the backend streaming system 810 can access a list of apps installed on the viewer's computing device. If the video app is not part of the installed apps, the backend streaming system 810 can automatically redirect to an URL (such as an app store page) where the viewer can install the video app. Once the video app is installed, the viewer can reactivate the link shared by the client system B 820*b* to view the video stream. If the backend system 810 determines that the video app has already been installed (e.g., by activating the link shared by the client system B 820*b*), the backend streaming system 810 can send instructions to the client system C 820*c* to automatically open the video app. In some embodiments, if the backend streaming system 810 determines that the viewer is a new user to the video app, the backend streaming system 810 may automatically provide one or more initiation tokens to the user's token repository entry.

The backend streaming system 810 and/or the client system C 820*c* can extract information associated with the link, such as the metadata of the video as well as information of the client system B 820*b*. If client system C 820*c* extracts the information associated with the link, the client system C 820*c* can communicate the extracted information to the backend system 810.

The backend system 810 can parse the extracted information and record that a viewer has accessed a shareable link of the video stream. This process of recording access of the shareable link may sometimes be referred to as recording a hit. For example, the hit may include information on the date, the identifier of the video stream, the identifier of the client system which shares the link, the identifier of the client system which views the link, and so on, alone or in combination. The hit may be used to calculate video statistics (such as how many viewers) as well as to process access tokens and share tokens. The backend streaming system 810 can return the video stream associated with the link at step 5. In certain implementations, the backend streaming system 810 may return a portion of the video stream as a preview and return the whole video stream when the user decides that he wants to access the whole video stream. An example user interface for providing the preview features is described with reference to FIG. 20B.

In some situations, the backend system 810 can determine whether the client system C 820c has met a threshold condition for accessing the video stream. For example, the backend system 810 can determine whether the client system C's 820c token repository entry has sufficient values of initiation tokens and/or exchange tokens to meet the threshold value for the access tokens of the stream. If the client system C 820c does not meet the threshold condition, the backend streaming system 810 may indicate to the user that he has not provided sufficient access tokens. In response to the backend streaming system 810's request, the client system C 820c can add exchange tokens to its token repository entry now or at a later point. If the client system C 820c provides the proper access tokens at a later time, the backend streaming system 810 can find the hit recorded previously and therefore will not re-record the hit.

At step 6, once the user has provided the access token(s), the backend streaming system 810 can update the token repositories associated with the client system A 820a and the client system B 820b based on the access token(s) and the share token(s) as described with reference to the token processing system 242 in FIG. 2A. In some implementations, the backend streaming system may provide an opt-in option to the client system B 820b for receiving the share token(s). If the client system B 820b does not opt-in, the client system B 820b may not receive the share token(s) even though the client system A 820a has specified the share token(s).

As described with reference to FIGS. 6 and 7. The backend streaming system 810 can take into account errors that occurred during the video stream to the client system C 820c while updating the token repositories. For example, the backend streaming system 810 may hold the processing of the access token(s) until a threshold duration of the video stream has met. In some embodiments, the backend streaming system 810 may have already processed the access token(s) before the error is detected, but the backend streaming system 810 can revert the processing of the access token(s) upon detection of the error.

FIG. 8B illustrates another example of link sharing process. In FIG. 8B, the broadcaster may want to share his video with other users. At the step 1 of the process 800b, the client system A 820a, which may be associated with the broadcaster, can send a request to the backend streaming system 810 requesting a shareable link of a video stream. The backend streaming system 810 can generate the link based on the broadcaster's information as well as metadata of the video. The backend streaming system 810 can return the shareable link to the client system A 820a.

At step 2, the client system A 820a can share the link with the client system B 820b using similar techniques as described with reference to FIG. 8A (where link is shared from the client system B 820b to the client system C 820c). The client system B 820b can further share the link with client system C 820c at step 3. In some implementations, the client system B 820b can pass the client system B's 826b identifier together with the link to the client system C 820c. For example, the video app of the client system B 820b can update the shareable link and/or the information associated with the link to include the client system B's 820b identifier. In some implementations, the video app of the client system B 820b may communicate with the backend streaming system 810 to associate the client system B's 820b identifier with the link, such as by incorporating the identifier itself in the link or by encoding the identifier into a string as part of the link. Additionally or alternatively, the video app may add the client system B's 820b identifier to the data packet for passing the link to the client system C 820c without needing to communicate with the backend streaming system 810.

At step 4, the client system C 820c can communicate with the backend streaming system 810 to request the video. As described with reference to step 5 in FIG. 8A, the backend system 810 or the client system C 820c can extract the information associated with the link. The backend system 810 can use the extracted information to record a hit, such as the client system C 820c has clicked on a link shared by the client system B 820b where the link is associated with a video created by the client system A 820a. The backend system 810 can also determine whether the client system C 820c has met a threshold condition for accessing the video stream. As described herein, the threshold condition may be specified by the broadcaster.

At step 5, the backend streaming system 810 can update one or more token repositories using similar techniques described with reference to step 6 in FIG. 8A.

FIG. 9 depicts an example flowchart of a link sharing process. The process 900 may be performed, for example, by backend streaming systems 110, 210a, 210b, 310, 810.

At block 910, the backend streaming system receives a request to share a video stream with other client systems from a requesting system. The requesting system may be a client system associated with a broadcaster or a viewer of the video stream. The request to share the video stream may be received before the stream starts, while the video is being broadcasted, or after the video stream ends.

At block 920, the backend streaming system can generate a URL linking to the video stream. The backend streaming system can also associate the URL with video metadata as well as information of the requesting system.

At block 930, the backend streaming system can communicate the generated URL to the requesting system. The requesting system can pass the URL to other client systems via the video app, social network applications, emails, text messages, or other communication channels, alone or in combination.

Once a client system receives the URL, the client system can send a request to the backend streaming system for viewing the video stream. At block 940, the backend streaming system receives a request from the client system to access the video stream. The backend streaming system can determine whether the client system has met a threshold condition for accessing the video stream at block 950. For example, the threshold condition may be whether the client system has provided a proper access token(s). If the client system has not met the threshold condition, at block 960, the backend streaming system can provide an indication to the client system showing that the threshold condition is not met. For example, the backend streaming system can communicate with a token repository and determine whether the entry associated with the client in the token repository include sufficient access tokens for viewing the video stream. The backend streaming system can then inform the client system that it does not have enough access tokens to access the stream. In response to this message from the backend streaming system, the client system may update the token repository entry to add additional access tokens to view the video stream.

If the client system meets the threshold condition for accessing the video stream at block 950, the backend streaming system can communicate the video stream to the client system at block 972. The backend streaming system can provide an indication to the requesting system that the video stream has been accessed at block 974. The indication may be an alert sent by the notification system 230 of the backend streaming system. If the requesting system is the broadcaster's client system, the indication may also be in the form of video statistics (e.g. how many people have viewed the video stream).

At block 974, the backend streaming system can update the token repositories associated with the requesting system (and broadcaster's system) based on the video metadata. For example, the token processing system 242 of the backend streaming system may process the access token(s) and the share token(s) of the video stream for updating the token repositories. As described with reference to FIGS. 6 and 7, the backend streaming system can also take into account errors during the video broadcasting for updating the token repositories.

In some implementations, the backend streaming system may return a portion of the video stream as a preview before determining whether the client system has met the threshold condition. The backend streaming system may perform block 950 when the user has chosen to view the whole video stream (instead of the preview).

IX. Example Video Streaming App User Interfaces

The video streaming app may be a mobile application, a web application, or a combination of the same. In one embodiment, the video streaming app is a mobile application that may be downloaded from an application store, such as the Apple App Store™ or the Google Play™ application store. In another embodiment, the video streaming app is accessed in a browser installed as another application on the user computing device 120. For example, users can access one or more uniform resource locators (URLs) with the browser to access the features of the video streaming app from one or more websites.

In certain embodiments, the video streaming app can include any subset of the following features. The video streaming app can provide comment promotion by the broadcaster 102 to keep new audience members informed of what's going on. The video streaming app can also provide viewer engagement bars, such as a bar at the top of the view which provides the ability for viewers and broadcasters 102 to gauge interest based on viewers' likes. The app 130 can also provide in-app analytics, such as current viewers, drop-offs, money earned, likes, and chats. The app can also retain videos for re-watching later (e.g., by storing those videos in the data store 112). The app can also include a Live Stream Preview, which can give a viewer a peek into a paid stream.

In addition, the video streaming app may also include any subset of the following features. For example, the video streaming app can also include subscriptions which can grant users access to some or all streams from one streamer. The video streaming app can further be in communication with a token processing system (further described with reference to FIGS. 2A, 2B, and 6-9. The token processing system can inform the broadcaster 102 as to how much money they have made in one easy view. Additionally, the video streaming app can measure a retention rate, which can include how many people are watching a stream vs. stopping watching of a stream before the stream ends. The video streaming app can also enable an unlimited audience for free or paid streams. The video streaming app can also enable viewers to easily discover videos through tags and searching. Additionally, the video streaming app can provide distraction-free viewing. For example, some or all controls may be off of the screen while watching a video. The video streaming app can also enable users to swipe left/right or up/down to view more information. The video streaming app can also allow users (such as broadcasters and viewers) to schedule an upcoming live event. A broadcaster 102 can set a price per stream using the video streaming app. The video streaming app can also provide VIP Access (e.g., all videos from a streamer) or Premium Access (e.g., one video at a time). The video streaming app can also be used in landscape and portrait modes.

FIGS. 10 through 21 depict example user interfaces of a video streaming app. The video streaming app may be embodiments of the video apps 222 and 322. The video streaming app illustrated in FIGS. 10 through 21 may be executed on the broadcaster's computing device 104 or the viewer's computing device 120 alone or in combination.

Each of the user interfaces shown includes one or more user interface controls that can be selected by a user, for example, using a browser or other application software. Thus, each of the user interfaces shown may be output for presentation by the application, which may optionally include a browser or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, game controller, or keyboard input, among other user interface input options. Although each of these user interfaces are shown implemented in a mobile device, the user interfaces or similar user interfaces can be output by any computing device, examples of which are described above. The user interfaces described herein may be generated electronically by the application or by the backend system described above.

Figure 10:
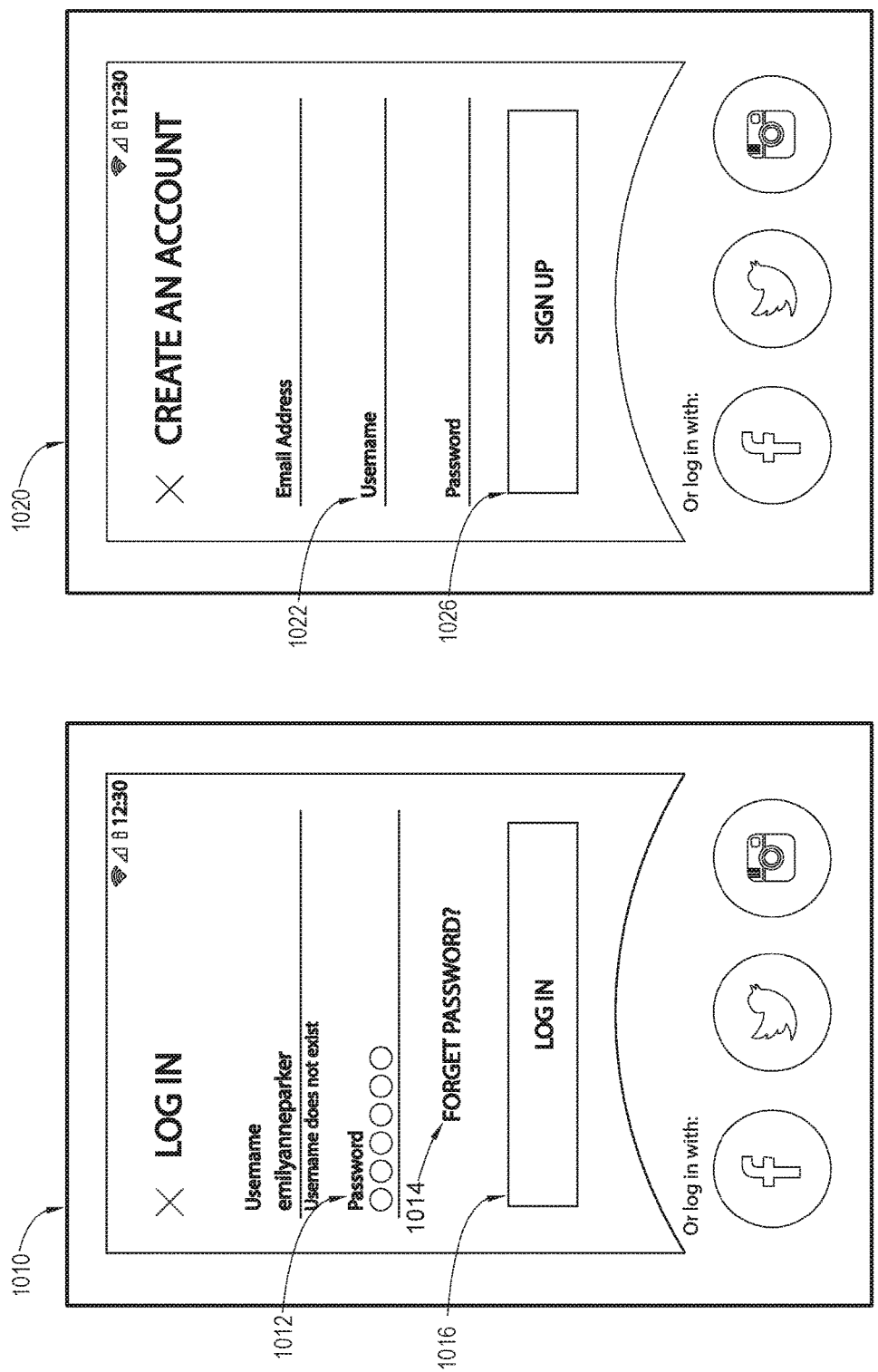
FIG. 10 depicts example user interfaces of a video streaming app.

FIG. 10 depicts example user interfaces of the video streaming app. The user interface 1010 illustrates a login page, where a user (e.g., a broadcaster or a viewer, alone or in combination) can enter his login credentials, such as username and password, at the section 1012 and submit the login credentials by selecting the user interface element 1016. As described with reference to FIG. 3, the access authorization component 338 can authenticate whether the user's login credentials are correct. If the user's login credentials are incorrect, the video app may present an indication of an error, such as if the user name does not exist. The user interface 1010 can also present an option to retrieve the user's password. For example, the user interface 1010 may include a user interface element 1014 which states "forgot password?". The user can select the user interface element 1014 to retrieve the password.

In some embodiments, the video app may present a sign up page to the user if the user does not have an account with the video app or if the user's login credentials are incorrect. As shown in the user interface 1020, the user can type in his email address, username, and password in the section 1022 and submit this information by selecting the user interface element 1026 to create a new account. Additionally or alternatively, the user can log into the video app using one or more social network accounts, such as accounts with Facebook, Twitter, or Instagram. As described herein, when a new user signs up an account, the backend streaming system may automatically provide an initiation token to the user's token repository entry.

Figure 11:
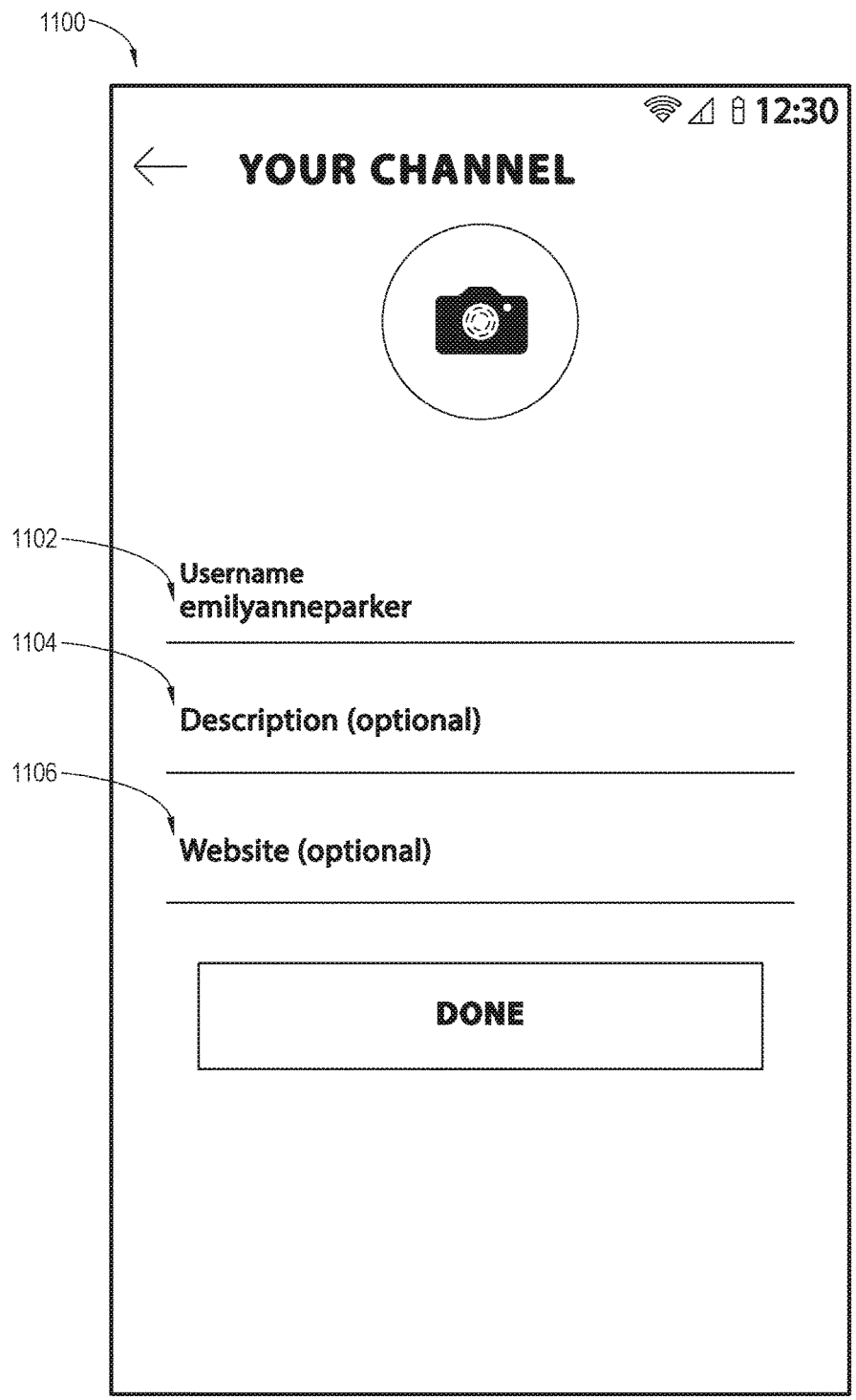
FIG. 11 depicts an example user interface for creating a video broadcasting channel.

There may be one or more video broadcast channels associated with a user's account. A video channel may include a set of videos generated by the user that is directed to a certain topic. FIG. 11 depicts a user interface for creating a video broadcasting channel. As shown in the user interface 1100, the user can create the channel by entering his user name (at the section 1102) and optionally a description of the channel (at the section 1104) as well as a website (such as a URL) associated with the channel at the section 1106.

Figure 12:
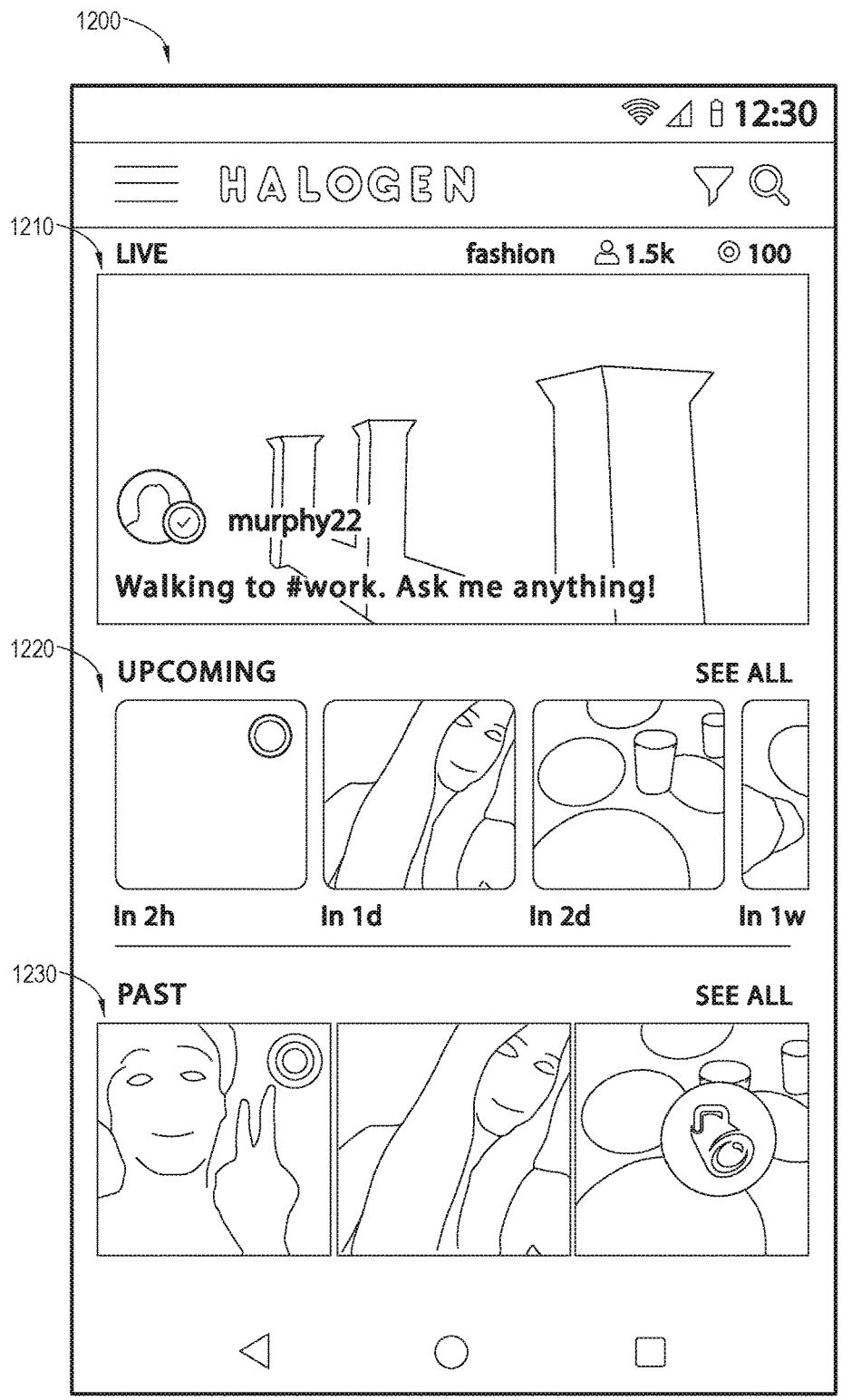
FIG. 12 depicts an example user interface for viewing a video stream.

FIG. 12 depicts an example user interface for viewing a video stream. The user interface 1200 can show preview pictures associated with the live videos in section 1210, upcoming live videos in section 1220, and past videos at section 1230. The user can view a live video as the broadcaster is recording it while the user can view a past video via VOD. The user may not be able to view upcoming videos because the live broadcasting has not begun yet. In some embodiments, a video might not have a preview picture. As shown in the left-most picture in the section 1220, the video app may display a default image if the video does not have a preview picture.

As described with reference FIG. 2A, at least a portion of the video metadata, such as the broadcaster's profile image, video preview image, as well as statistics may be retrieved form the video data store 214. In some embodiments, a portion of the video metadata may also be retrieved from the user data store 212. For example, the video segment playlists or statistics of the video stream may be retrieved from the user data store 212.

The video app can also display statistics and at least portion of the video metadata to the broadcaster. As shown in section 1210, the video app can show the descriptions of the video, a profile image of the broadcaster, the nickname of the broadcaster, the number of viewers, and the amount of access tokens associated with the video.

Figure 13:
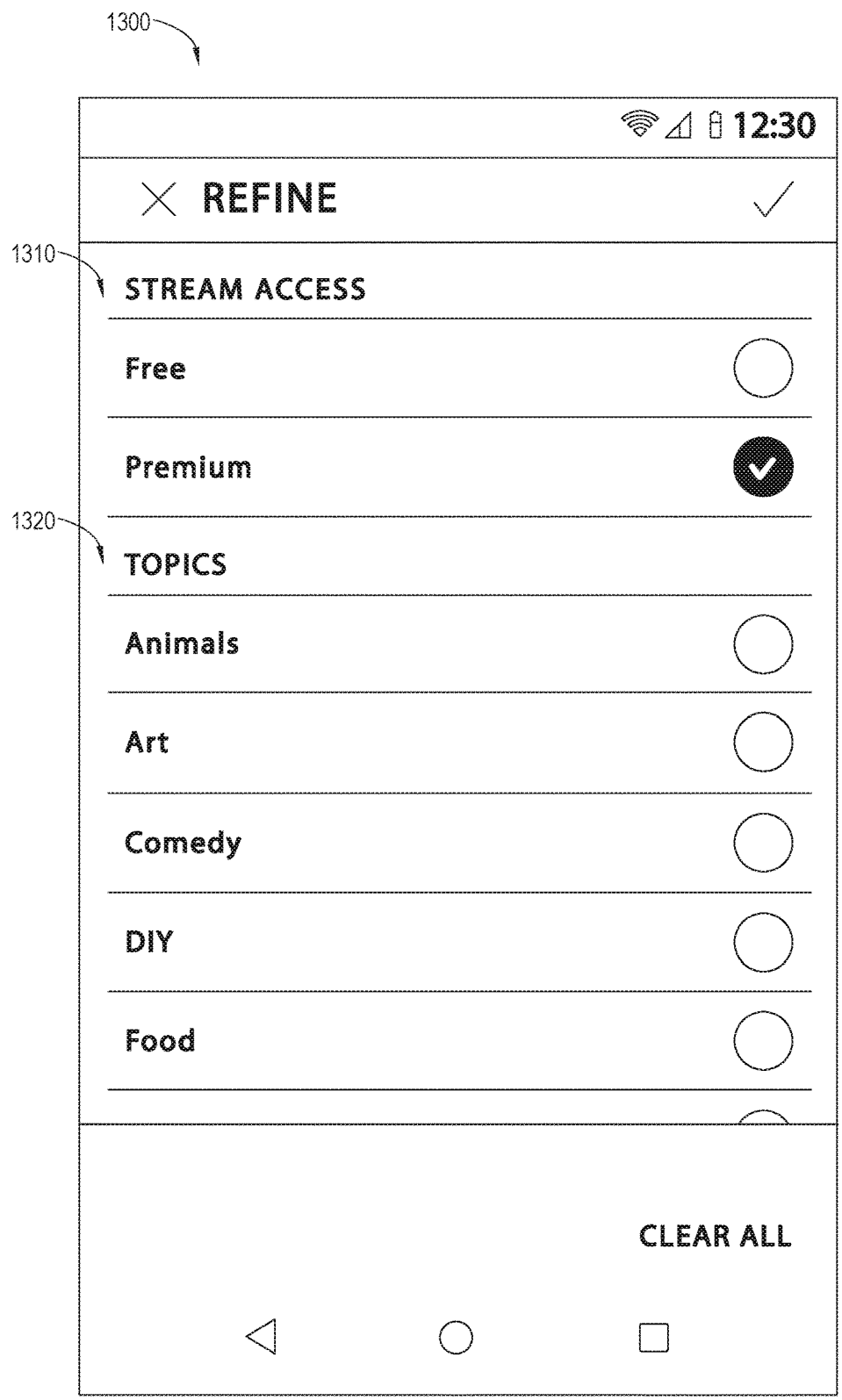
FIG. 13 depicts an example user interface for searching for a video stream of interest.

The user can search for videos of interest. FIG. 13 depicts an example user interface for searching for a video stream of interest. As shown in the user interface 1300 in FIG. 13, the user can select video streams under one or more topics at the section 1320. The user can also choose, at the section 1310, video streams based on whether an access token is used.

Figure 14A:
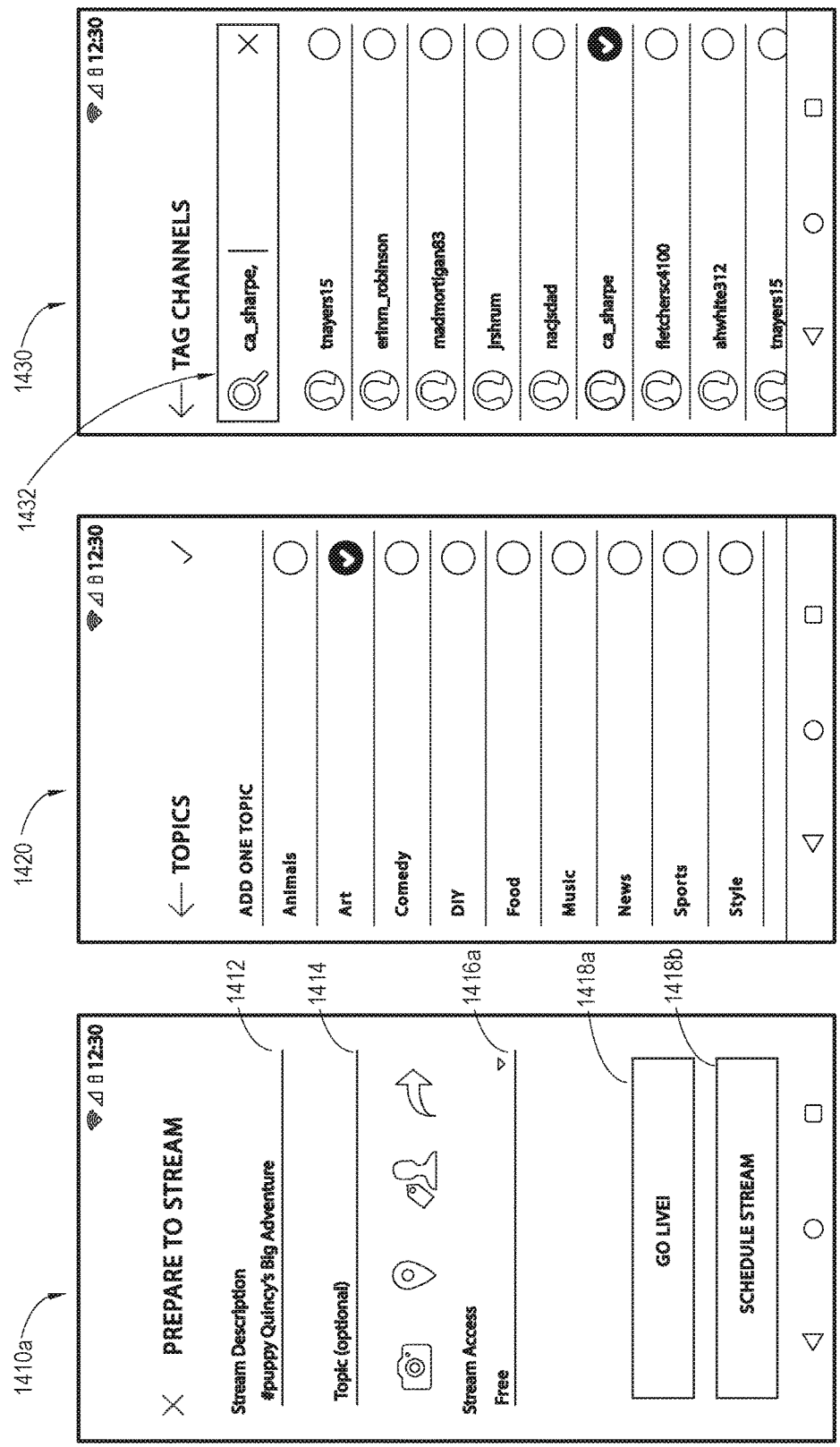
Figure 14B:
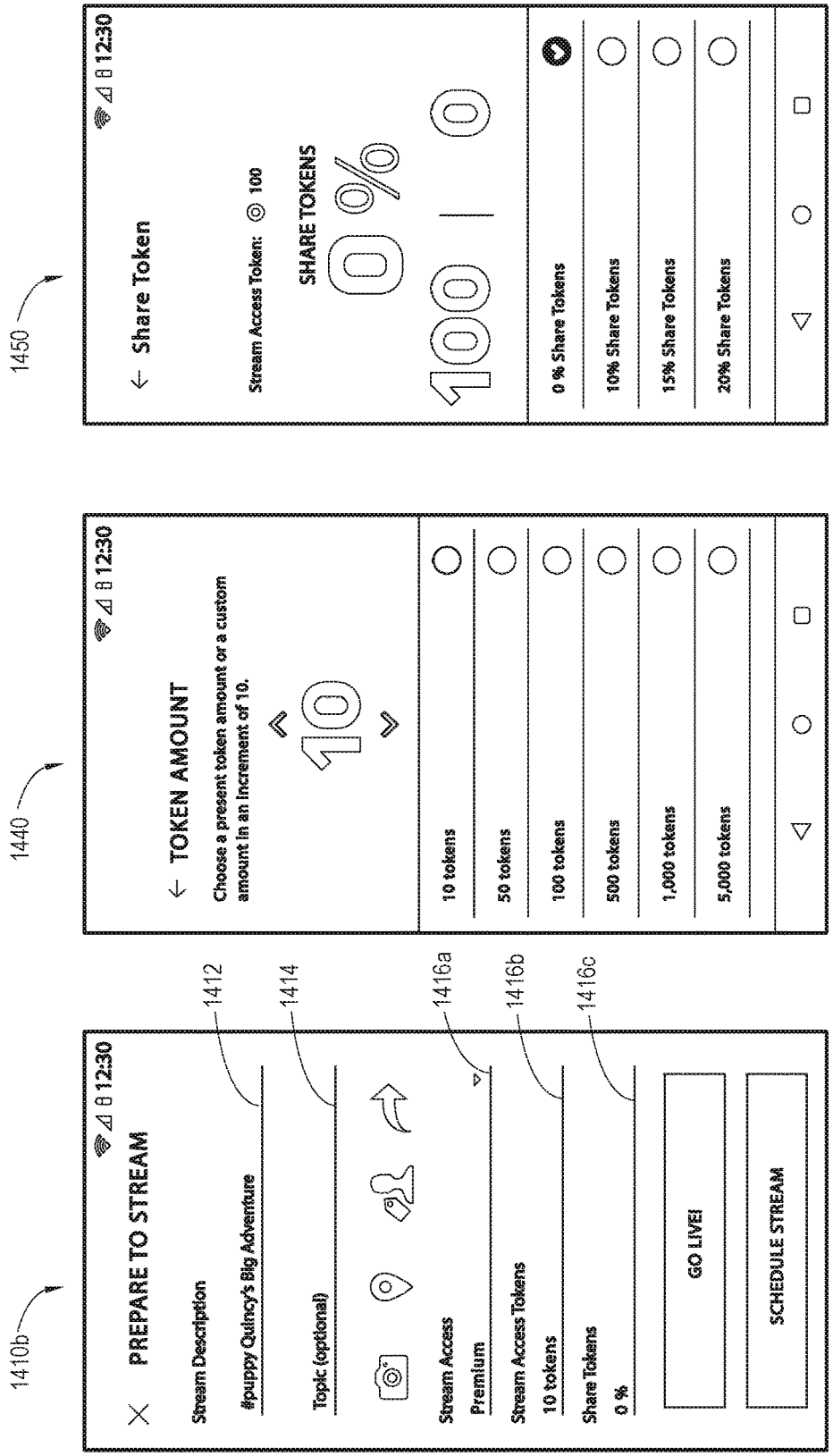

FIGS. 14A, 14B, and 15 depict example user interfaces for creating and configuring a video stream. For example, in the user interface 1410*a* of FIG. 14A, a broadcaster can enter the stream description at the section 1412, add a topic at the section 1414, and select whether the access token is used at the section 1416*a*. In the example user interface 1410*a*, the user has selected the option where the access token is not used. In some implementations, the user can select one or more topics associated with the stream at the user interface 1420. The broadcaster can further select tag channels at the user interface 1430. For example, the broadcaster may enter a name of the channel in the search box 1432 and select a channel among the search result.

The broadcaster can specify whether the video stream uses an access token at the user interface 1410*b*. Similar to the user interface 1410*a*, the broadcaster can specify the stream description at the section 1412, the topic at the section 1414, and select whether the access tokens are used at the section 1416*a*. In this example user interface, the broadcaster has selected that the access tokens are used. The user can further configure the parameters of the access tokens (such as the amount of access tokens) at the section 1416*b* and in the user interface 1440. For example, the broadcaster can use the upward and downward arrows to adjust the amount of access tokens. The broadcaster can also select the amount of access tokens by checking the boxes associated with the numerical values. In some implementations, the user can check one box. In other implementations, the user may check more than one box and the amount of access tokens may be amount in the boxes combined. In some situations, the user can first check the boxes and use the upward and downward arrows to make more refined adjustments to the amount. The amount of access tokens as adjusted by the user interface 1440 may be reflected in the section 1416*b* of the user interface 1410*b*.

The user can also configure the share token(s) at the user interface 1410*b* and the user interface 1450, where the amount of share tokens as configured on the user interface 1450 may be reflected in the user interface 1410*b*. In some embodiments, the option for configuring the share tokens is available if the video stream uses an access token. In the user interface 1450, the broadcaster can set the amount of share tokens to be equal to a percentage of the amount of access tokens. In this example, the percentage is set to 0. As a result, the viewers who share the link to the video stream will not receive the share token(s). As described with reference to the token processing system 242 in FIG. 2A, the backend streaming system may set an upper limit of the percentage to be less than 100%.

The user interface 1510 in FIG. 15 includes the information associated with a new video stream. The information may include the topics and tags of the video stream, the schedule time (and a countdown timer) for broadcasting the video stream, the access token(s), and the broadcaster's image and name. The video stream information shown in the user interface 1510 may be entered at the user interfaces in FIGS. 14A and 14B.

The user interface 1510 may include a user interface element 1512 (e.g., a "report stream" button) which can initiate the video recording process once the user selects that element. With reference to FIG. 3, once the user initiates the video recording, the video generation component 334 may detect the hardware components used for recording the video. For example, the video generation component 334 may detect that the broadcaster's computing device has a camera and a microphone that may be used to record the video. However, the video app may not yet have privilege to access the camera and the microphone. As a result, the video app may present the user interface 1520 for user's permission use the camera and microphone to start streaming.

FIG. 16 depicts example user interfaces for viewing video analytics and comments. The video analytics and comments may be shown in the real-time during the live broadcast to a broadcaster.

As an example, the user interface 1610 may show a summary of the live stream, such as the stream's description, topic, and duration at the section 1612. The user interface 1610 can also show the statistics of the video stream at the section 1614. For example, the statistics may include number of viewers, number of likes, number of downloads, number of previews, number of comments, as well as the access tokens obtained.

The user interface 1630 can show real-time comments while a video is being streamed. For example, the user interface 1630 can show the content of the comments as well as the users who made the comments at the section 1632. The user interface 1630 can also display notifications such as the example notification 1634 which shows a user has joined the stream.

While the video app is broadcasting a video in real-time at the user interface 1620, a broadcaster can interact with the user interface 1620 using hand gestures. For example, when the broadcaster swipes along a trajectory (such as leftward) on the screen of the user computing device, the video app may accordingly present the user interface 1610. On the other hand, when the broadcaster swipes rightward on the screen, the video app may present the user interface 1630 to the user.

Figure 17:
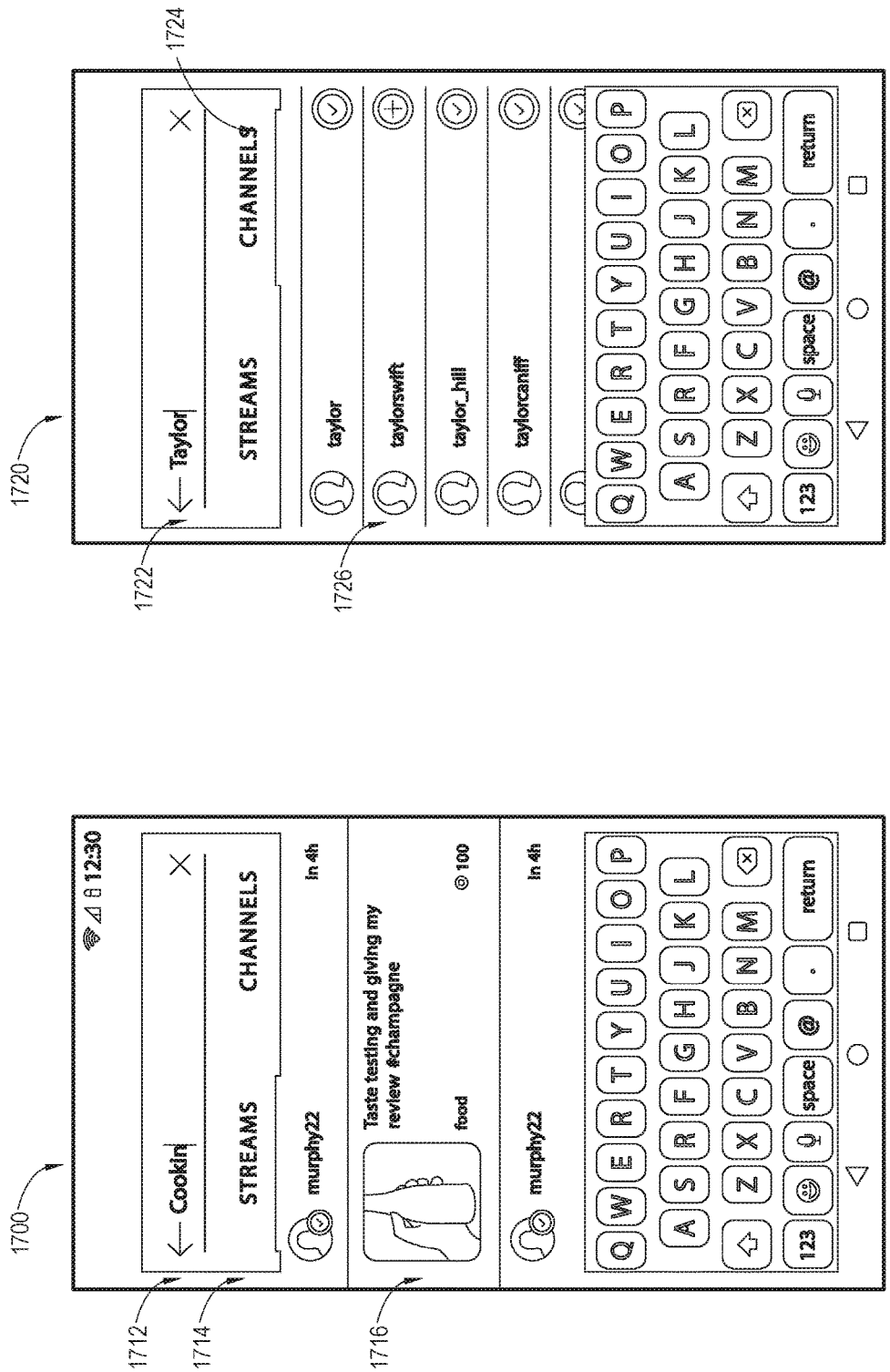
FIG. 17 depicts example user interfaces for searching video streams or video channels.

FIG. 17 depicts example user interfaces for searching video streams or video channels. The user interfaces 1710 and 1720 include a search box 1712, 1722 respectively, in which the user can enter a keyword. The search option 1714 is set to streams in the user interface 1710 while the search option 1724 is set to channels in the user interface 1720.

In the user interface 1710, the video app can return a list of search results 1716. The search results may include information on the video such as the preview image, the broadcaster, the description, the topic, and the access token(s) used. The results 1726 shown in the user interface 1720 may include a list of channels. Among the list of channels, the user may have already been following some of the channels. The user can unselect the followed channels or follow new channels appearing in the search results.

Figure 18:
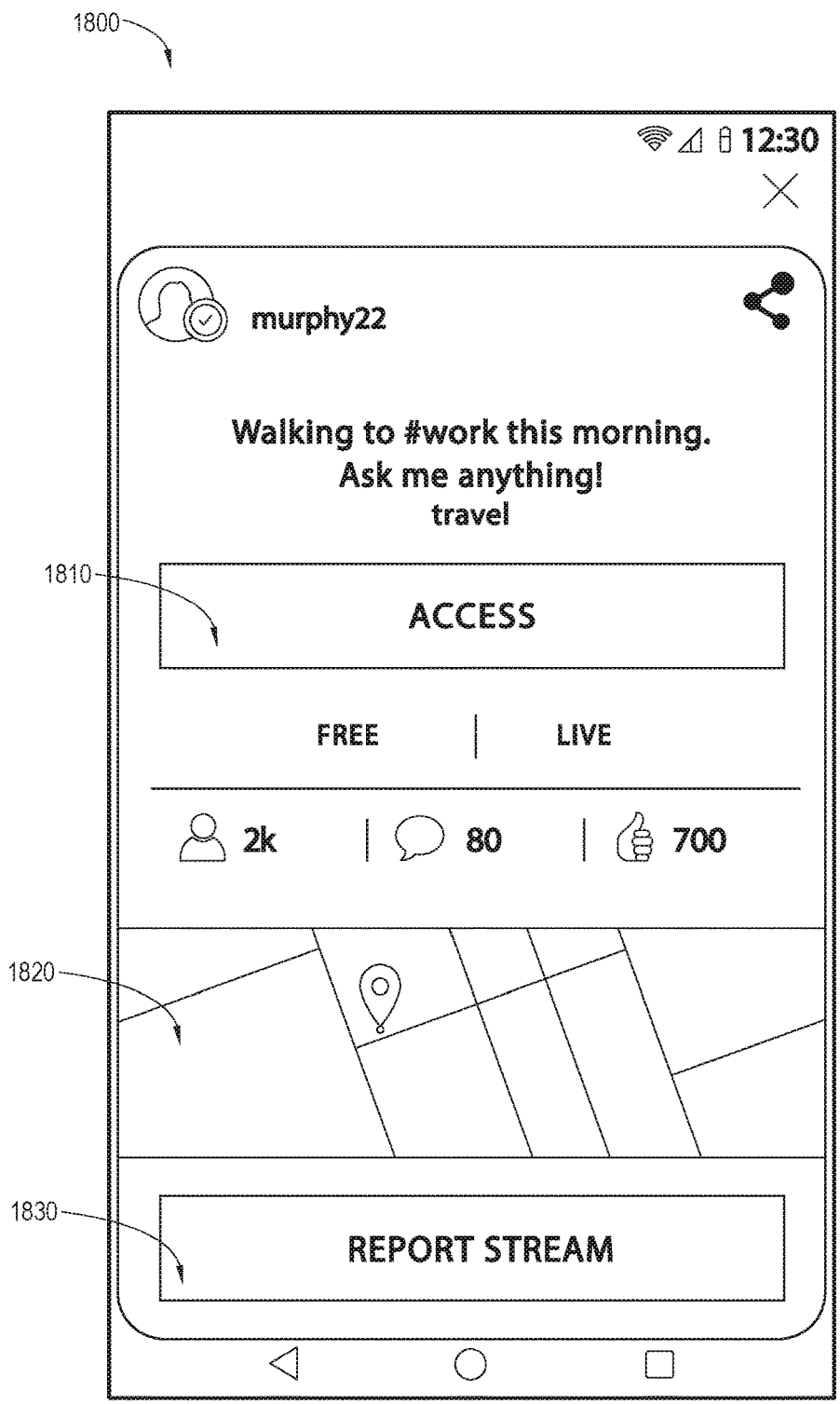
FIG. 18 depicts an example user interface which offers both the option of viewing a video stream and the option of broadcasting a video stream.

FIG. 18 depicts an example user interface which offers both the option of viewing a video stream and the option of broadcasting a video stream. The user interface 1800 includes descriptions of a video stream as well as the metadata of the video stream. For example, the user interface shows the view statistics associated with the video stream, the tag and descriptions of the video stream, as well as the broadcaster's information (image and name) of the video stream. The user may select the user interface button 1810 to access a video stream.

The user interface 1800 also displays a map at section 1820 which may indicate the user's current location. For example, the video app can retrieve the user's location data by using the GPS sensor of the user's computing device. The user can select the user interface element 1830 to initiate a video recording. In response to the user's selection, the video app may present user interfaces shown in FIGS. 14A, 14B, and 15. The video recording may be broadcasted as live videos and/or as VOD.

Figure 19:
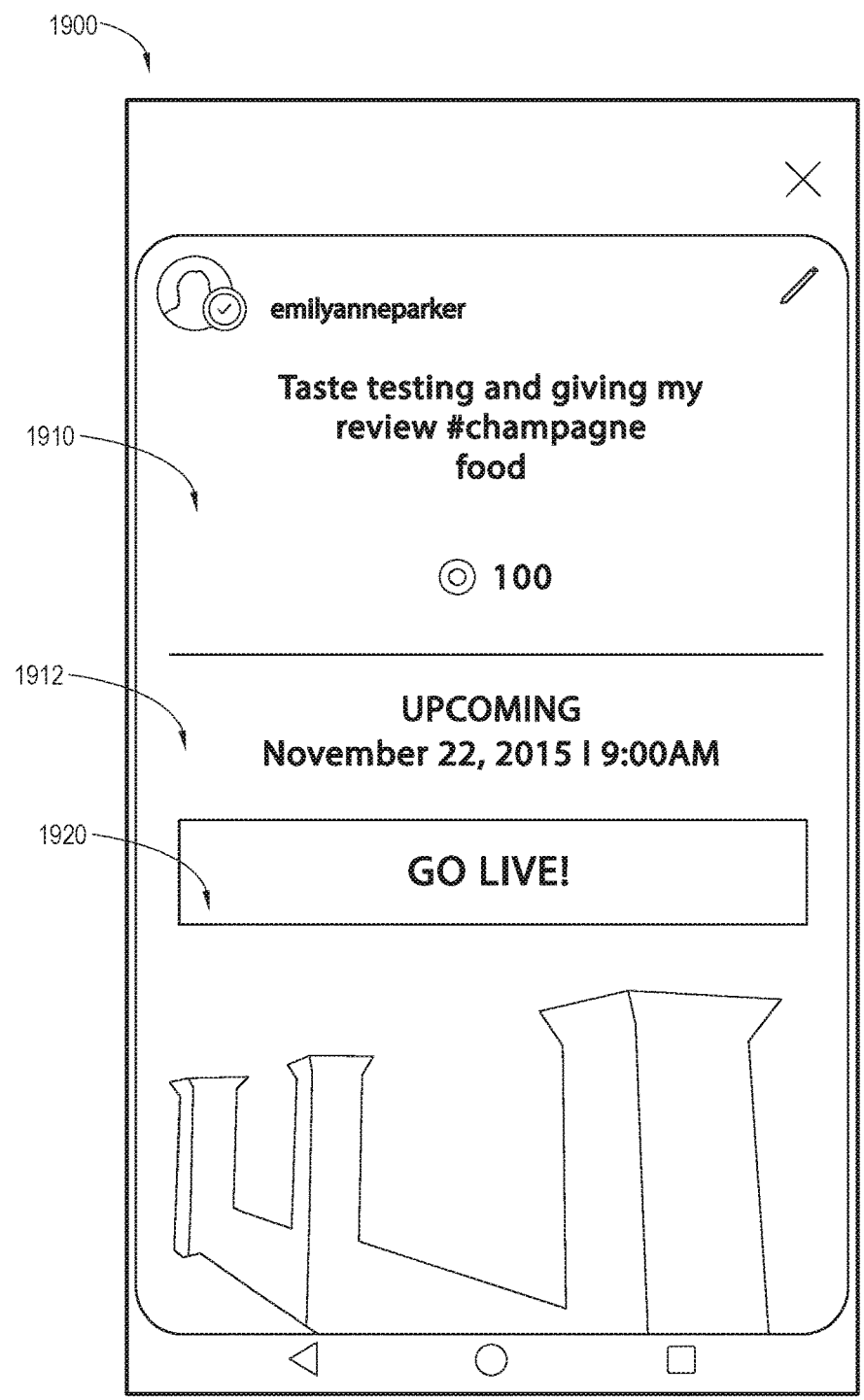
FIG. 19 depicts an example user interface 1900 for scheduling a live stream.

FIG. 19 depicts an example user interface for scheduling a live stream. The user interface 1900 shows video metadata at section 1910, such as the broadcaster, the description and tag, as well as the access token(s) used for the video stream. In addition, the user interface 1900 shows, at the section 1912, a scheduled time that the video will go live. The user can select the user interface button 1920 "go live!" to upload the video stream to the backend streaming system. In some embodiments, once the user selects the user interface button 1920, the video may be broadcasted earlier than the scheduled time.

Figure 20A:
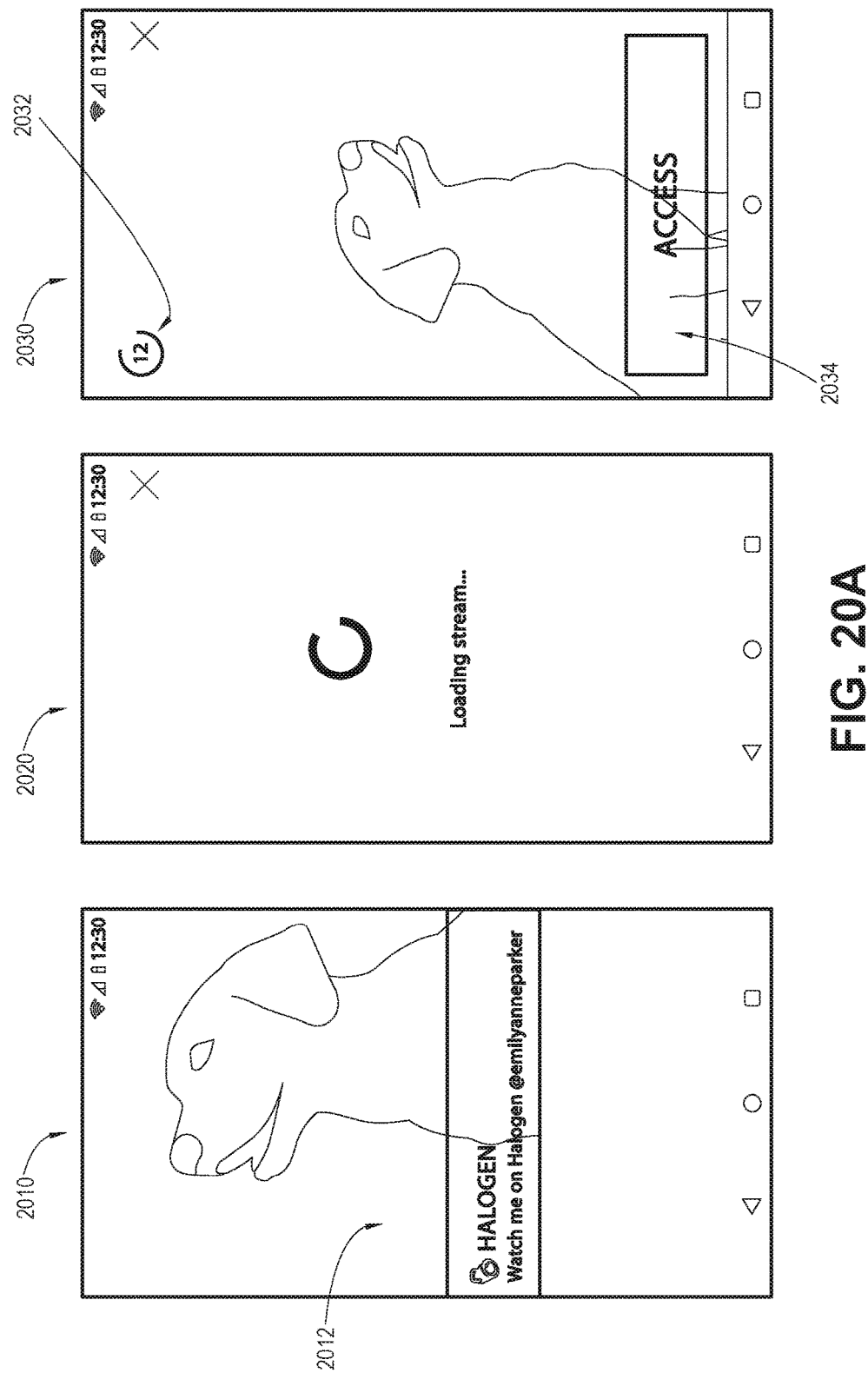

FIGS. 20A and 20B depict example user interfaces for viewing a video stream. In the user interface 2010, the video app can show the video at the section 2012. Although in this example the video is shown in the portrait mode, the video can also be shown in the landscape mode in other implementations.

As described with reference to FIGS. 2A, 2B, and 5, once the user selects a video stream, the video app can communicate with the backend streaming system to retrieve the video segments. In some situations, there might be network delays for downloading the video segments. As a result, the video app may present the user interface 2020 indicating that the video is still loading.

The user interface 2030 illustrates an example of accessing the video stream. The user interface may include an access button 2034 which the user can select for accessing the video stream. The user interface can also include an indication of duration for the video stream at user interface element 2032. As described with reference to FIGS. 6 and 7, the backend streaming system can monitor the duration of the video stream. If the duration is less than a threshold, the token processing system may revert the previous processing of the access token(s) or may hold the processing of the access token(s) until the duration meets the threshold.

In some implementations, an access token is not used to view the video. In other implementations, the viewer may use one or more access tokens to view the video. As a result, once the user selects the access button 2034, the backend streaming system can determine whether the token repository entry of the user has enough initiation tokens and/or exchange tokens to meet the amount of access tokens. If the user's entry in the token repository does not have enough tokens, the user may be prompted to add exchange tokens to his token repository. In some implementations, once the user provides the access token(s), the user may have unlimited access to the video stream where the user can repeatedly watch the video stream.

The video app can also provide a preview feature where the user can preview a portion of the video stream before deciding on whether he will watch the whole video. As shown in the user interface 2040 in FIG. 20B, once the user finishes the preview, the user can choose to replay the preview. The user can also access the full video by selecting the user interface element 2042.

The preview feature may be available in situations where the access token is not used. The preview feature may also be available where the access token is used. For example, after a portion of the video is played as the preview, the video app may request the user to provide one or more access token(s) to continue watching the video. The backend system may check the user's token repository entry to determine whether the user's token repository entry includes sufficient initiation tokens or exchange token to cover the amount of access tokens. If the token repository entry is sufficient to cover the amount of access tokens, the user may be provided with an option to access the video stream using one or more access tokens. Otherwise, the user may receive an indication inviting the user to add exchange tokens to the user's entry in token repository.

The user can also interact with the video stream while the user is watching it. For example, the user can view comments and notifications (such as whether another viewer has joined the stream) in the user interface 2050. As described with reference to FIGS. 2, 3, and 5, the user's computing device can receive the comments and notifications from the nonfiction system of the backend system.

The user can also make a comment in the user interface element 2054. The comment may be communicated to the backend system which processes the comment and transmit the comment to other video apps. The notifications and comments can be shown, for example at the section 2052 of the user interface 2050.

The user can also like a video by interacting with the user interface element 2064 in the user interface 2060. The user interface 2060 may also provide a bar 2062 indicating how much time has elapsed since the beginning of the video as well as the length of the video.

FIG. 21 depicts example user interfaces which allow a user to configure security settings of his account. In the user interface 2110, the user can set privacy settings (at the section 2112) as well as notification settings (at the section 2114). For example, the user can choose whether to show the streams that the user has clicked like. The user can also choose which types of notifications that the video app will receive from the backend streaming system. As shown in the user interface section 2114, the user has chosen to receive alerts in situations where a person that the user follows is going to live broadcast, the user has a new follower, and the user is tagged in a stream.

In the user interface 2120, the user can also select the option for configuring blocked users. The video app can present the user interface 2120 for the user to choose which accounts to block. As shown in the user interface 2120, the user has chosen to block two other users.

These settings may be communicated to the backend system. The backend system may store these settings in a data store, such as the user data store 212 shown in FIGS. 2A and 2B.

X. Optional Additional Token Processing Embodiments

In some embodiments, the tokens described herein may represent virtual currency, such as coins. The access token, for instance, may have a value which may correspond to the monetary value of the virtual currency. More generally, the tokens described herein can represent any form of currency, such as coins, bitcoins, dollars, or the like, or can otherwise be an electronic form of currency that has an exchange rate with legal tender. For example, one token can have a value represented by some fractional amount of a dollar or the like. The initiation tokens may be promotional coins which are provided by the video app to incentivize the user to purchase a video stream (such as when a new user registers an account). The exchange tokens may be purchase coins which can be purchased by a user using money. The value of the access tokens may be the value of the initiation tokens, the value of the exchange tokens, or a combination of the value of the initiation tokens and the value of the exchange tokens. For example, a user can spend either the exchange tokens or the initiation tokens or both for watching a video.

The tokens may be stored in a token repository which may be part of the user data store 212, the data store 112, or the video data store 214, alone or in combination. An entry of the token repository may correspond to amounts of the tokens associated with a client system (such as the values in a user's payment account). In some implementations, a client system may be associated with multiple entries of the token repository. The client system may also be associated with its own token repositories. Additionally or alternatively, the token information may be stored in a user profile (rather than in the token repository).

A user can cash out either type of tokens, optionally subject to restrictions designed to reduce fraud. Some examples of such restrictions are described below. For example, a user can cash out the coins from his payment account. This cash out process may sometimes be referred to as token removal process. The amount of initiation tokens and the amount of exchange tokens can also be transferred from one token repository entry to another token repository entry (which may sometimes be referred to as token transfer process). For example, for a user to watch a video, the token processing system 242 can generate one or more access tokens as a combination of the initiation token and the exchange token and transfer of the access token(s) from the user's entry in a token repository to the broadcaster's entry in the token repository. In some embodiments, the token processing system may apply the initiation token first before applying the exchange token when a user decides to watch a video stream. For example, if the amount of the initiation tokens is sufficient to cover the video stream, the access token(s) may include the initiation tokens. On the other hand, if the amount of initiation token is insufficient to cover the video stream, the access token(s) may include all of the initiation tokens and a portion of the exchange tokens. Although in this example, the initiation token is applied before the exchange token, in other example embodiments, the initiation token and the exchange token may be applied proportionally. For example, the amount of access tokens may include an equal split of the initiation token and the exchange token where both types of tokens still have an amount remaining even after a portion of the tokens have been contributed to the amount of access tokens.

A viewer may receive a refund for the amount of access token spent when the video fails to stream or when the video streams for less than a threshold period of time. This refund process may be part of the interrupt detection or error detection process described with reference to FIGS. 6 and 7. The backend streaming system can initially process an amount of access tokens so that the viewer can have access to a video stream. For example, the token processing system of the backend streaming system can transfer the amount of access tokens from the viewer's entry in the token repository to the broadcaster's entry in the token repository. While the viewer is viewing the video streaming, the backend streaming system can determine whether the video stream is played for less than 60 seconds, fails to be transferred to the user in its entirety, or is interrupted during a certain time period, etc. If one or more of these situations occur (referred to above in one example as detecting an error), the token processing system can return or refund the amount of access tokens to the viewer by transferring the amount of access tokens from the broadcaster's entry in the token repository to the viewer's entry in the token repository.

In some embodiments, the backend streaming system will not process the access tokens until a threshold period of time has passed. Once the threshold period of time has reached and the video stream is still playing, the backend streaming system can transfer the amount of access tokens from the viewer's entry in the token repository to the broadcaster's entry in the token repository. Otherwise, the access tokens remain in the viewer's entry in the token repository. Additionally or alternatively, the backend streaming system can hold the amount of access tokens for the video stream in an escrow account until the video has streamed for a threshold period of time. For example, the backend streaming system may transfer the amount of access tokens from the viewer's entry in the token repository to the escrow account when the user starts the video stream. If the threshold period of time has lapsed and the video is not interrupted or terminated, the backend streaming system can transfer the amount of access tokens from the escrow account to the broadcaster's entry in token repository. Otherwise, the backend streaming system will return the amount of access tokens from the escrow account to the viewer's entry in the token repository.

Because the amount of access tokens may include a combination of initiation tokens and exchange tokens, the token processing system can return the both the initiation tokens and the exchange tokens as initially transferred from the viewer's entry in the token repository.

As further described below, in some embodiments, a portion of the amount of the access tokens may be share tokens which may be distributed to a referrer. The token processing system can take into account the share tokens during the refund process. For example, the token processing system can refund the viewer by transferring the access token from the broadcaster's entry in the token repository and the share token from referrer's entry in the token repository to the viewer's entry in the token repository. As another example, the backend streaming system can use the escrow account to hold the amount of access tokens (which may include share tokens) and only distribute the share tokens to the referral after the threshold time period.

The value of the initiation token may be proportional to the value of the exchange token. As an example, the value of the system coin may be ⅒ of the value of the exchange token. Therefore, the token processing system 242 can use a conversion rate to convert the initiation token to the exchange token based on the relative values of the system coin and the exchange coin. The amount of initiation token (and the conversion rate) may be dynamically updated based on factors such as values of the initiation tokens or values of the exchange tokens associated with all of the client systems (or a subset of the client systems). For example, when there are a lot of initiation tokens available in the backend system, the value of each initiation token may be less than when there are a few initiation tokens available. As another example, if the backend streaming system has 10 times more initiation tokens than the currency tokens, the conversion rate between the initiation token and the currency token may be 10:1. Although this example uses a linear relationship, other types of mathematical relationships may also be used.

This conversion rate may be applied to both the token removal process and the token transfer process. For example, the token processing system 242 can convert the initiation token to the exchange token for accessing the video stream. As a result, the access token(s) may include the exchange token. The amount of exchange tokens may be transferred, for example, by the token processing system 242, from the token repository entry associated with the viewer to the token repository entry associated with the broadcaster. As a result, the broadcaster can receive the exchange tokens, even though the viewer can transfer out the values of both the initiation tokens and the exchange tokens. In some embodiments, in a token transfer process, the access token(s) may include the initiation tokens or a combination of initiation tokens and the exchange tokens. The token processing system 242 can make the conversion prior to the token removal process or prior to depositing the amount of the access token(s) to the broadcaster's token repository entry.

As another example, during the token removal process, the conversion rate may be separately applied to the initiation token and to the exchange token. For example, assuming the conversion rate between the initiation token and the exchange token is 5:1, during the token removal process, the value of each initiation token may be 0.2 times of the value of an exchange token. As a result, to achieve the same value, the token processing system 242 may deplete the initiation tokens 5 times faster than the exchange token.

In some implementations, the conversion rate used during the token transfer process may be different with the conversion rate used for token removal process. For example, the ratio between the value of the initiation token and value of the exchange token may be 1:1 during the token transfer process while the ratio may be 10:1 during the token removal process. As an example, to apply against two access tokens, the token processing system 242 may apply 1 initiation token and 1 exchange token, 2 exchange tokens, or 2 initiation tokens. However, to remove 1 initiation token may have the effect of removing 0.1 exchange token during the token removal process.

As described herein, the value of the initiation token may be dynamically updated by the token processing system 242. As an example, the maximum value of a initiation token during a token removal process may be calculated in accordance with the following formula:

$$\overline{v} \leq \frac{a-v}{N} \quad [1]$$

where a represents the minimum cost per token, v represents the value of the exchange token during the removal process, and N represents the maximum number of initiation tokens per exchange token. In this example, setting N to a higher value may allow a quicker depletion of the initiation tokens. Therefore, it may be desirable to set N at a high value where the amount of initiation token in relation to the exchange token is high. This situation may occur soon after the video app 222 is launched. The values for v and a may be set based on the monetary value of the exchange token. Where the exchange token is associated with a virtual coin, the value of v may be set to 0.0033 per dollar which may be derived based on average price per coin. An example of how to derive the value of exchange token (the value of the variable v) for the removal process is illustrated in the table below. The value of a may be set to 0.0066 per dollar or some other amount. Although the values are expressed in dollars, other types of units may also be used. In certain implementations, instead of calculating $\overline{v}$ based on the formula above, the value of may be set based on other factors such as profitability, cost per unit, or cost per customer acquisition, alone or in combination.

| Exchange Tokens | Costs | Cost per Token | Transaction Loss (30%) | Value at Removal | Remaining Value |
|---|---|---|---|---|---|
| 100 | 0.99 | 0.00990 | 0.297 | 0.33 | 0.36 |
| 350 | 2.99 | 0.00854 | 0.897 | 1.155 | 0.94 |
| 600 | 4.99 | 0.00832 | 1.497 | 1.98 | 1.51 |
| 1300 | 9.99 | 0.00768 | 2.997 | 4.29 | 2.70 |
| 3500 | 24.99 | 0.00714 | 7.497 | 11.55 | 5.94 |
| 7500 | 49.99 | 0.00667 | 14.997 | 24.75 | 10.24 |
| Value of v | | 0.0033 | | | |

In some embodiments, value of the initiation token may not be depleted from an entry in the token repository without accompanying the exchange token. The token processing system 242 can use the conversion rate described herein to set the maximum value of the initiation token that can be removed. For example, the conversion rate between the initiation token and the exchange token may be 5:1. As a result, in order to remove 5 initiation tokens, the user may need to remove 1 exchange token. In other implementations, the token processing system 242 may apply one conversion rate for calculating the value of the initiation token and the exchange token during the removal process while apply another (different) conversion rate for determining how many initiation tokens are allowed to be removed with one exchange token.

Restricting the removal of initiation token without the exchange token during the removal process may be particularly advantageous for preventing fraud. For example, the token processing system 242 may automatically provide initiation tokens to a new user. As a result, the user may be incentivized to register multiple accounts to receive initiation tokens in order to cash out more than what his has spent. This technique may also be advantageous to incentivize broadcasters to generate better streams because the broadcasters may receive the exchange tokens from other viewers before the broadcasters can remove (e.g. cash out) the initiation tokens.

As further described with reference to FIGS. 8A, 8B, and 9, a broadcaster may set a share token when a user shares the link with another user. The amount of share tokens may be a portion of the amount of access tokens. In some embodiments, the share token may be a referral bounty, where the user who shares the link of a video stream may receive a portion of the payment made by the viewer. One purpose of the share token as a referral bounty may be to increase viewership of a video stream. For example, a portion of the proceeds obtained from paying viewers of that stream may be shared between the streaming user and users who refer others to view the stream. The portion shared may be the referral bounty (or share token) or some portion thereof.

As an example, the amount of share tokens may be set in accordance with the following equation:

$$0 \leq B \leq \operatorname{floor}\left(\frac{P}{2}\right) \quad [2]$$

where B refers to the amount of share tokens, and P refers to the amount of access tokens. In this example, if B=0, user who shares the link with other viewers may not receive the share token. If $$B = \operatorname{floor}\left(\frac{P}{2}\right),$$

then the broadcaster can receive half of the access tokens while the user who shares the link can receive the other half of the access tokens as share tokens. The value P/2 is advantageously chosen to avoid transferring a large amount of tokens (such as to avoid money laundering) from the viewer's token repository entry to the token repository entry associated with the user who shares the link, although values other than $$\operatorname{floor}\left(\frac{P}{2}\right)$$

may be used in the equation. As an example, the amount of access tokens may change over the lifetime of the shareable link because the broadcaster may change the value of the access token. The token processing system 242 may attempt to continue maintaining a fair share for the user who shares the link by aligning the share tokens close to the original portion granted by the broadcaster. Therefore, the value of P may be set to be greater than or equal to 2. On the other hand, the value of P may also be set to 0. This change in the value of the access token may affect future accesses to the video stream.

In some situations, the access token(s) may include both the initiation token and the exchange token. As a result, the token processing system 242 can include a portion of the initiation tokens and a portion of the exchange tokens in the amount of share tokens. As an example, the access token(s) may be parsed and distributed to the token repository entry of the broadcaster and the token repository entry of the user who shares the link in accordance with the following formula (e.g. formula [i]-[vii]). The token processing system 242 can calculate a ratio (Z) for between the amount of initiation tokens in relation to the amount of access tokens for a video stream:

$$Z = \frac{\bar{c}}{c + \bar{c}} \quad [3]$$

where $\bar{c}$ is the amount of initiation tokens, c is the amount of exchange tokens, and $c+\bar{c}$ is the amount of access tokens (which can also be referred to as P).

A random number may be selected from a range between 0 and 1 as shown below:

$$0 \leq r \leq 1 \quad [4]$$

where r represents the random number.

The token processing system 242 can further set a gap filler (F) as shown below:

$$F = \begin{cases} B - \operatorname{floor}(B \cdot z) - \operatorname{floor}(B \cdot (1-z)), & r < z \\ 0, & r \geq z \end{cases} \quad [5]$$

where B represents the value of the share token, and z represents the ratio between the initiation tokens and the access tokens as calculated in the equation [3]. This gap filler may be used to calculate the portion of the amount of access tokens associated with the user who shares the link. For example, the portion (b) of the initiation tokens received by the user who shares the link may be calculated using the following equation:

$$\bar{b} = \operatorname{floor}(B \cdot z) + F \quad [6]$$

where $\bar{b}$ represents the amount of the portion of the initiation tokens associated with the user. The variable $\bar{b}$ may further be used to calculate the portion of the amount of exchange tokens associated with the user sharing the link using the following equation:

$$b = B - \bar{b} \quad [7]$$

where b represents the value of the portion of the exchange token distributed to the token repository of the user who shares the link.

The values of $\bar{b}$ and b may be used to calculate the portion of the access tokens received by the broadcaster's token repository entry. For example, the amount of initiation tokens received by the broadcaster's token repository entry may be represented by the value $\bar{p}$ calculated in the equation [8] while the amount of exchange tokens received by the broadcaster's token repository entry may be represented by the value p calculated in the equation [9].

$$\bar{p} = \bar{c} - \bar{b} \quad [8]$$

$$p = c - b \quad [9]$$

This process of dividing initiation tokens and exchange tokens in the access tokens may be advantageous for ensuring a fair division (between the 2 types of the tokens as well as between the broadcaster and the viewer sharing the link) in the long run. This division technique may also maintain the ratio between the initiation token and the exchange token similar to the conversion rate (described herein) for both the broadcaster and the viewer who share the link.

In some implementations, the conversion rate between the initiation token and the exchange token may be different during the token transfer process and during the token removal process. Therefore, the token processing system 242 can advantageously adjust the system coin ratio (e.g., the variable z calculated in the equation [3]) to introduce a bias among the users who share a link.

XI. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, or combinations of the same or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for detecting an interrupted video stream broadcast, the system comprising:

a video streaming system comprising a plurality of servers configured in a distributed network architecture, at least one of the plurality of servers comprising a hardware processor configured to:
- receive first video data from a first client device, the first video data comprising a plurality of bits of video;
- store the first video data in a video data store comprising physical computer storage, for subsequent processing;
- encode the first video data into second video data appropriate for subsequent broadcasting as a video stream to a plurality of other client devices subscribed to access the video stream, wherein encoding of the first video data into second video data formats the second video data into a plurality of video formats compatible with a plurality of different video processing protocols used by the other client devices;
- broadcast bits of the video stream to at least some of the other client devices while receiving additional bits of the first video data from the first client device, the additional bits also adapted to be subsequently stored, encoded, and broadcasted as part of the video stream;
- receive a request for access to the video stream from a second client device of the plurality of other client devices;
- communicate with a token processing system to identify an access token stored in a token repository and associated with the second client device;
- determine that the access token associated with the second client device meets a threshold condition for accessing the video stream;
- in response to a determination that the access token associated with the second client device meets the threshold condition, stream the second video data to the second client device and process the access token;
- determine that the second video data has streamed for a threshold time duration by detecting an interrupt in the video stream while receiving the video stream from the first client device, wherein the interrupt causing a cessation of the video streaming, wherein the interrupt is based on the following:
  - reception of multiple requests to view the same video from the second client device; and
  - a comparison of a number of bits delivered to the second client device to a threshold number of bits;
- in response to a determination that the second video data has streamed less than the threshold time duration, return the access token to its original state prior to the request for access to the video stream by the second client device;
- receive comment data from a third client device, the comment data comprising a message and user-identifying information configured to indicate which user account is associated with the comment data, wherein the message comprises a string of alphanumeric characters; and
- broadcast the comment data to at least some of the other client devices including the second client device, wherein the comment data is configured to be overlaid on the second video data, and wherein the comment data is further configured to be displayed in a format that is at least partially transparent so that the second video data is visible through the overlaid comment data.

2. The system of claim 1, wherein to determine that the second video data has streamed for the threshold time duration, the hardware processor is configured to perform the following:
- tracking that a segment of the video stream has been accessed by the second client device.

3. The system of claim 1, wherein to determine that the access token associated with the second client device meets a threshold condition for accessing the video stream, the hardware processor is configured to calculate a value of the access token and determine that the value of the access token corresponds with accessing the video stream.

4. The system of claim 1, wherein the access token comprises at least one of an initiation token or an exchange token.

5. The system of claim 4, wherein a value of the initiation token correlates with a value of the exchange token and wherein the hardware processor is further configured to dynamically adjust a ratio of the value of the initiation token and the value of the exchange token.

6. The system of claim 4, wherein to determine that the second client device meets the threshold condition for accessing the video stream, the hardware processor is configured to determine that a value of the initiation token, a value of the exchange token, or a value of a combination of the initiation token and the exchange token corresponds with accessing the video stream.

7. The system of claim 4, wherein processing the access token comprises:
- determining that the access token comprises the initiation token; and
- converting the initiation token to the exchange token.

8. A method for detecting an interrupted video stream broadcast, the method comprising:
- under control of a video streaming system comprising a plurality of servers configured in a distributed network architecture, at least one of the plurality of servers comprising a hardware processor:
  - receiving first video data from a first client device, the first video data comprising a plurality of bits of video;
  - splitting the first video data into a plurality of video segments;
  - storing the plurality of video segments in a data store for subsequent processing;
  - generating a playlist comprising links to video segments in the plurality of video segments;
  - encoding the first video data into second video data appropriate for subsequent broadcasting as a video stream to a plurality of other client devices subscribed to access the video stream;
  - receiving a request for access to the video stream from a second client device of the plurality of other client devices;
  - determining that a threshold condition is met for accessing the video stream by analyzing an access token in a token repository associated with the second client device;
  - in response to a determination that the threshold condition is not met, communicating at least a portion of the playlist to the second client device and broadcasting the video segments on the playlist to the second client device;
  - determining that the second client device has received at least a predetermined duration of the video stream by detecting an interrupt in the video stream within the predetermined duration of the video stream, wherein the interrupt is based on the following:
  reception of multiple requests to view the same video from the second client device; and
  a comparison of a number of bits delivered to the second client device to a threshold number of bits;
in response to a determination that the second client device has received at least the predetermined duration of the video stream, processing the access token;
receiving comment data from a third client device, wherein the comment data comprises a string of alphanumeric characters; and
broadcasting the comment data to the second client device, wherein the comment data is configured to be overlaid on the video stream, and wherein the comment data is further configured to be displayed in a format that is at least partially transparent so that the second video data is visible through the overlaid comment data.

9. The method of claim 8, wherein determining that the second client device has received at least the predetermined duration of the video stream further comprises calculating a length of the playlist to determine that the length of the video stream is less than the predetermined duration.

10. The method of claim 8, wherein determining that the second client device has received at least the predetermined duration of the video stream further comprises tracking that one or more links of the playlist have been accessed by the second client device.

11. The method of claim 8, wherein determining that a second client device meets the threshold condition for accessing the video stream comprises calculating a value of the access token and determine that the value of the access token corresponds with accessing the video stream.

12. The method of claim 8, wherein the access token comprises at least one of an initiation token or an exchange token, a value of the initiation token correlates with a value of the exchange token and the method further comprises dynamically adjusting a ratio the value of the initiation token and the value of the exchange token.

13. The method of claim 8, further comprising:
  receiving additional bits of the first video data from the first client device while broadcasting at least a portion of the video segments to the second client device;
  updating the playlist to include the additional bits; and
  communicating the updated playlist to the second client device.

14. A system for detecting an interrupted video stream broadcast, the system comprising:
  a video processing system comprising a plurality of servers, the video processing system configured to:
    receive first video data streamed from a first client device,
    create a playlist comprising links to video segments of a video stream generated based at least partly on the first video data, and
    store the playlist and the video segments of the video stream in a data store comprising physical computer storage; and
  a video streaming system comprising a hardware processor, the video streaming system configured to:
    receive a request from a second client device for accessing the video stream;
    communicate with a token repository of the second client device to determine that the token repository comprises one or more access tokens associated with the second client device;
    in response to a determination that the token repository of the second client device comprises the one or more access tokens, process the one or more access tokens and communicate the playlist to the second client device for accessing the video stream by the second client device;
    receive comment data from a third client device, wherein the comment data comprises a string of alphanumeric characters;
    broadcast the comment data to the second client device, wherein the comment data is configured to be overlaid on the video stream, and wherein the comment data is further configured to be displayed in a format that is at least partially transparent so that the second video data is visible through the overlaid comment data;
    determine that the second client device fails to stream the video stream for a predetermined duration of time by detecting an interrupt in the video stream within the predetermined duration of time, wherein the interrupt is based on the following:
      reception of multiple requests to view the same video from the second client device; and
      a comparison of a number of bits delivered to the second client device to a threshold number of bits; and
    in response to a determination that the second client device fails to stream the video stream for the predetermined duration of time, restore the one or more access tokens to their original state prior to being processed by the video streaming system.

15. The system of claim 14, wherein to determine that the second client device fails to stream the video stream for the predetermined duration of time, the video streaming system is configured to:
  tracking that a segment of the video stream has been accessed by the second client device.

16. The system of claim 15, wherein to determine that the second client device fails to stream the video stream for the predetermined duration of time, the video streaming system is further configured to:
  calculate a length of the playlist to determine that the length of the video stream is less than the predetermined duration of time; or
  track that one or more links of the playlist have been accessed by the second client device.

17. The system of claim 14, wherein the access token comprises at least one of an initiation token or an exchange token.

18. The system of claim 17, wherein a value of the initiation token correlates with a value of the exchange token, and wherein the hardware processor is further configured to dynamically adjust a ratio of the value of the initiation token and the value of the exchange token based at least in part on the one or more initiation tokens or exchange tokens being removed from, added to, or transferred from the token repository.

19. The system of claim 1, wherein the hardware processor is further configured to:
  parse the comment data to determine that a portion of the comment data includes one or more inappropriate words, wherein the inappropriate words are words that have been preconfigured and stored on a database; and
  generate filtered comment data by filtering the one or more inappropriate words.

20. The system of claim 1, wherein the number of bits delivered to the second client device is fewer than the threshold number of bits.

* * * * *